(12) United States Patent
Roumeliotis

(10) Patent No.: US 8,572,072 B1
(45) Date of Patent: Oct. 29, 2013

(54) CLASSIFYING A FINANCIAL TRANSACTION USING A SEARCH ENGINE

(75) Inventor: George Roumeliotis, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 198 days.

(21) Appl. No.: 13/032,534

(22) Filed: Feb. 22, 2011

(51) Int. Cl.
*G06F 7/00* (2006.01)
*G06Q 30/00* (2012.01)

(52) U.S. Cl.
USPC .......................................... 707/722; 705/14.4

(58) Field of Classification Search
None
See application file for complete search history.

(56) References Cited

U.S. PATENT DOCUMENTS

| | | | | |
|---|---|---|---|---|
| 4,771,630 | A * | 9/1988 | Croce et al. ..................... | 73/49.3 |
| 7,043,492 | B1 * | 5/2006 | Neal et al. .............................. | 1/1 |
| 7,225,184 | B2 * | 5/2007 | Carrasco et al. ...................... | 1/1 |
| 7,428,509 | B2 * | 9/2008 | Klebanoff ....................... | 705/38 |
| 7,523,099 | B1 * | 4/2009 | Egnor et al. .......................... | 1/1 |
| 7,912,868 | B2 * | 3/2011 | Calistri-Yeh et al. ......... | 707/803 |
| 8,027,941 | B2 * | 9/2011 | Probst et al. ..................... | 706/14 |
| 2009/0327224 | A1 * | 12/2009 | White et al. ....................... | 707/3 |

OTHER PUBLICATIONS

Rodgers et al., "Thirteen Ways to Look at the Correlation Coefficient", The American Statistician, Feb. 1988, vol. 42, No. 1.*

* cited by examiner

*Primary Examiner* — James Trujillo
*Assistant Examiner* — Mohsen Almani
(74) *Attorney, Agent, or Firm* — Osha Liang LLP

(57) ABSTRACT

A method involves classifying a financial transaction of an item. The method steps include receiving a text description of the item, processing the text description to generate a search term, selecting a set of named categories, conducting a first search for the search term and each named category, processing first results of the first search, calculating an affinity score for each named category, identifying a first target affinity score, identifying a target category from the set of named categories, presenting the text description and the target category, receiving feedback that the target category is incorrect, generating a revised set of named categories by removing the target category from the set of named categories, conducting a second search for the search term and each of the revised set of named categories, and presenting a revised target category.

34 Claims, 6 Drawing Sheets

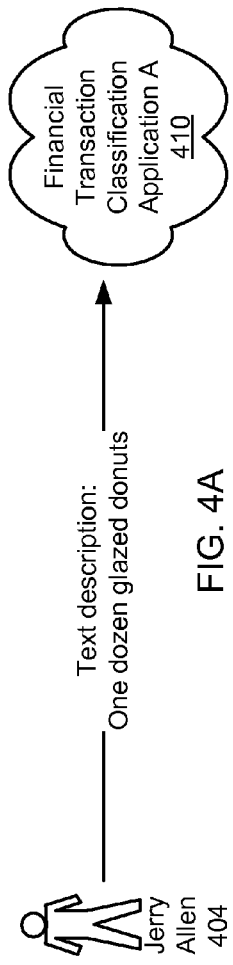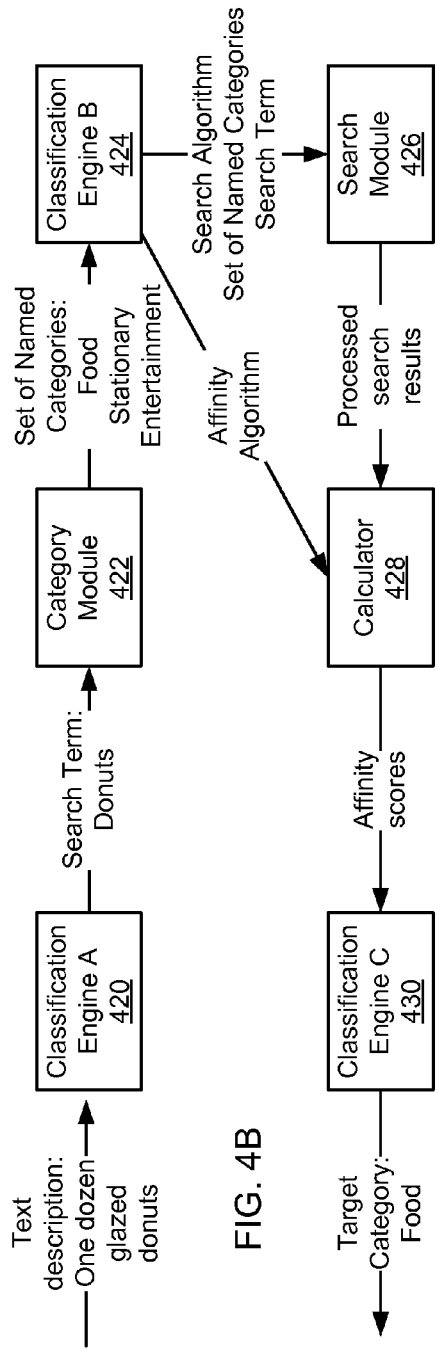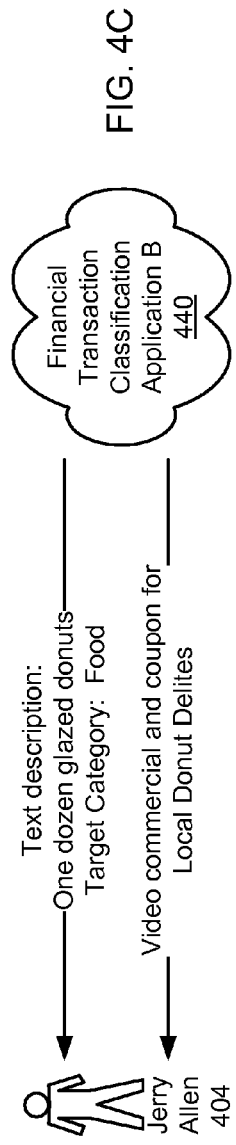
FIG. 4A
FIG. 4B
FIG. 4C

Search Algorithm:
Search Engine

Affinity Algorithm:
$D(x,y) = n(x\&y)/(\sqrt{n(x) \times n(y)})$

| Named Category | Search Engine n(x&y) | Search Engine n(x) | Search Engine n(y) |
|---|---|---|---|
| Food | 4,640,000 | 11,500,000 | 742,000,000 |
| Stationary | 98,000 | 11,500,000 | 40,300,000 |
| Entertainment | 2,640,000 | 11,500,000 | 566,000,000 |

| Named Category | Affinity Score |
|---|---|
| Food | .0502 |
| Stationary | .0046 |
| Entertainment | .0327 |

CLASSIFYING A FINANCIAL TRANSACTION USING A SEARCH ENGINE

BACKGROUND

When an entity enters into a series of financial transactions, the entity may organize those financial transactions. One way to organize financial transactions is to categorize each financial transaction. When categorizing financial transactions, purchases and/or sales made for a similar purpose or having a similar characteristic may be grouped together. Determining which category to assign to a particular financial transaction is referred to as classification. Classification of a financial transaction may be used for a number of purposes, including but not limited to accounting and budgeting.

SUMMARY

In general, in one aspect, the invention relates to a method for classifying a financial transaction of an item. The method steps include (1) receiving a text description of the item involved in the financial transaction, (2) processing, using a computer processor, the text description of the item to generate a search term, (3) selecting, based on the search term, a set of named categories of a plurality of named categories, (4) conducting, using a first search engine determined by a search algorithm, a first search for the search term and each named category of the set of named categories, (5) processing, using the computer processor, a first plurality of results of the first search, (6) calculating, using the first plurality of results of the first search and an affinity algorithm, an affinity score of a plurality of affinity scores for each named category of the set of named categories, (7) identifying a first target affinity score of the plurality of affinity scores, (8) identifying a target category from the set of named categories based on the first target affinity score, (9) presenting, to a user, the text description of the item involved in the financial transaction and the target category, (10) receiving feedback that the target category for the financial transaction is incorrect, (11) generating a revised set of named categories by removing the target category from the set of named categories, (12) conducting, using the search algorithm, a second search for the search term and each named category of the revised set of named categories, and (13) presenting, based on a second plurality of results of the second search, a revised target category based on a second target affinity score.

In general, in one aspect, the invention relates to a method for presenting an advertisement based on classifying a financial transaction of an item. The method steps include (1) receiving a text description of the item involved in the financial transaction, (2) processing, using a computer processor, the text description of the item to generate a search term, (3) selecting, based on the search term, a set of named categories of a plurality of named categories, (4) conducting, using a search engine determined by a search algorithm, a search for the search term and each named category of the set of named categories, (5) processing, using the computer processor, a plurality of results of the search, (6) calculating, using the plurality of results of the search and an affinity algorithm, an affinity score of a plurality of affinity scores for each named category of the set of named categories, (7) identifying a target affinity score of the plurality of affinity scores, (8) identifying a target category from the set of named categories based on the target affinity score, (9) selecting, using an advertisement algorithm, the advertisement based on the advertisement advertising a product in the target category, and (10) presenting the advertisement.

In general, in one aspect, the invention relates to a system for classifying a financial transaction of an item. The system includes a computer processor, a classification engine, a category module, a search module, and a calculator. The classification engine executes on the computer processor and is configured to (1) receive a text description of the item involved in the financial transaction, (2) process the text description of the item to generate a search term, and (3) receive, from a user, feedback that a target category based a target affinity score is incorrect. The category module, search module, and calculator each execute on the computer processor and are operatively connected to the classification engine. The category module is configured to (1) receive the search term from the classification engine, (2) select, based on the search term, a set of named categories of a plurality of named categories, and (3) generate, in response to the feedback, a revised set of named categories by removing the target category from the set of named categories. The search module is configured to (1) conduct, using a search engine determined by a search algorithm, a first search for the search term and each named category of the set of named categories, (2) process a first plurality of results of the first search, (3) conduct a second search for the search term and each named category of the revised set of named categories, and (4) process a second plurality of results of the second search. The calculator is configured to (1) calculate, using the first plurality of results of the first search and an affinity algorithm, an affinity score of a plurality of affinity scores for each named category of the set of named categories, (2) identify a first target affinity score of the plurality of affinity scores, (3) identify a target category from the set of named categories based on the first target affinity score, (4) send, to the classification engine, the text description of the item involved in the financial transaction and the target category, (5) calculate, using the second plurality of results of the second search, a second affinity score of a second plurality of affinity scores for each named category of the revised set of named categories, (6) identify a second target affinity score of the second plurality of affinity scores, (7) identify a revised target category from the revised set of named categories based on the second target affinity score, and (8) send, to the classification engine, the revised target category, where the classification engine displays, to the user, the text description of the item involved in the financial transaction, the target category based the target affinity score, and the revised target category based on the second target affinity score.

In general, in one aspect, the invention relates to a computer readable medium that includes computer readable program code embodied therein for performing a method for classifying a financial transaction of an item. The method steps include (1) receiving a text description of the item involved in the financial transaction, (2) processing the text description of the item to generate a search term, (3) selecting, based on the search term, a set of named categories of a plurality of named categories, (4) conducting, using a first search engine determined by a search algorithm and, a first search for the search term and each named category of the set of named categories, (5) processing a first plurality of results of the first search, (6) calculating, using the first plurality of results of the first search and an affinity algorithm, an affinity score of a plurality of affinity scores for each named category of the set of named categories, (7) identifying a first target affinity score of the plurality of affinity scores, (8) identifying a target category from the set of named categories based on the first target affinity score, (9) presenting, to a user, the text description of the item involved in the financial transaction and the target category, (10) receiving feedback that the target category for the financial transaction is incorrect, (11) generating a revised set of named categories by removing the target category from the set of named categories, (12) conducting, using the search algorithm, a second search for the search term and each named category of the revised set of named categories, and (13) presenting, based on a second plurality of results of the second search, a revised target category based on a second target affinity score.

Other aspects of the invention will be apparent from the following description and the appended claims.

BRIEF DESCRIPTION OF DRAWINGS

FIGS. 4A through 4C show an example in accordance with one or more embodiments of the invention.

DETAILED DESCRIPTION

Figure 1:
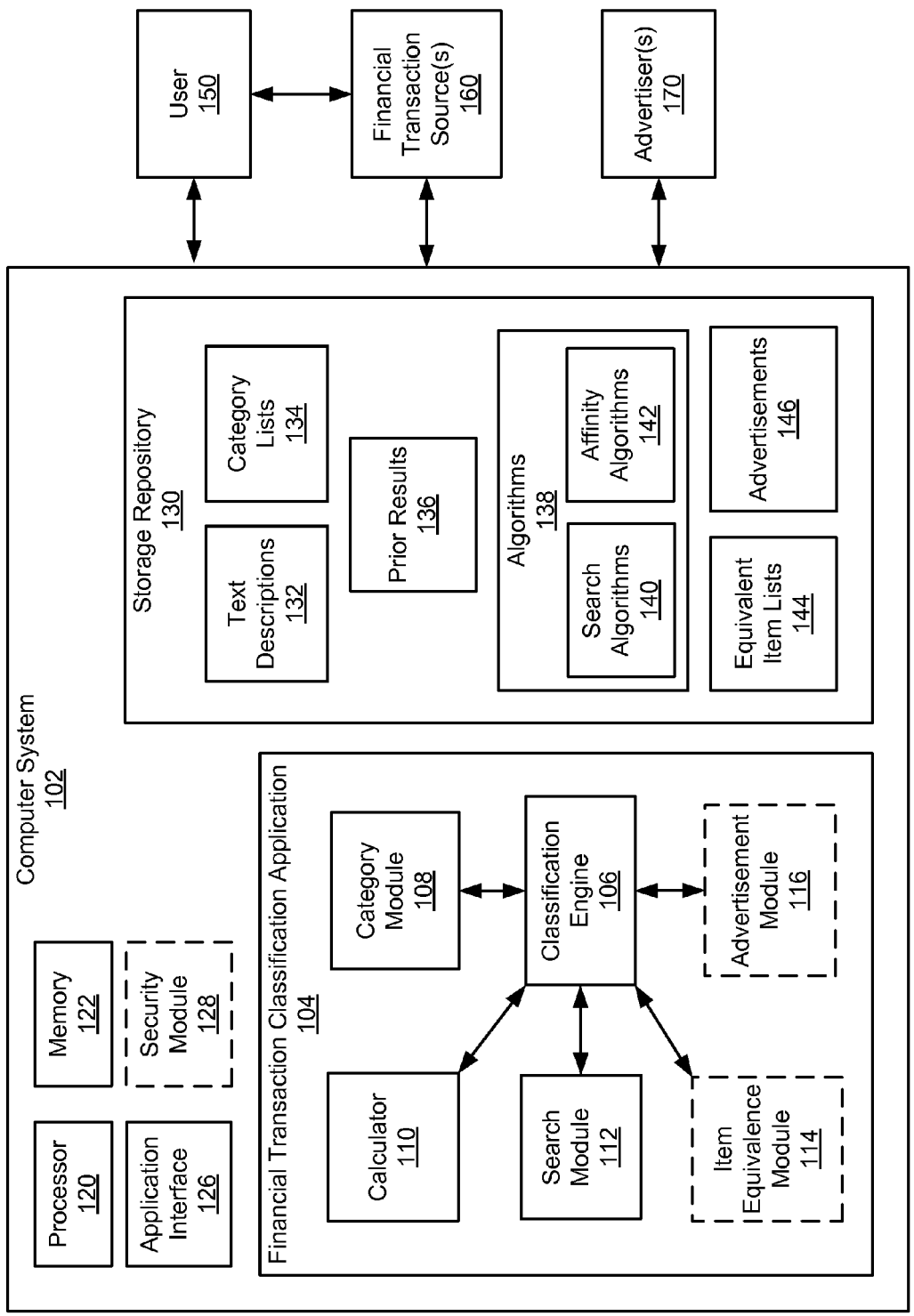
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention classify a financial transaction using a search engine. Specifically, one or more embodiments of the invention identify an affinity score for the description of the financial transaction and each category of a set of categories using one or more search engines. Based on the affinity score for each category of the set of categories, embodiments of the invention select the category with a target affinity score as the category of the financial transaction. Thus, one or more embodiments of the invention provide a method and system for associating, using one or more search engines, a financial transaction with one of a number of categories established to assist a user in organizing the financial transaction.

A financial transaction may be any transaction or exchange (whether for or without consideration; past, current, or prospective; etc.) made by a user. A financial transaction may involve an item (e.g., a good, a service, currency, an entity (e.g., a buyer, a seller, a donor, a donee, etc. in a financial transaction), some other suitable transaction item, any combination thereof). An item involved in a financial transaction may be described using one or more words (i.e., text description). Examples of an item of a financial transaction include, but are not limited to, a product (e.g., a particular make and model of phone), a type of product (e.g., swimsuit), a brand (e.g., Porsche®), a vendor (e.g., Kmart®), and a type of vendor (e.g., lawyer). (Porsche® is a registered trademark of Dr. Ing. h.c. F. Porsche Aktiengessellschaft Corporation of the German Democratic Republic; Kmart® is a registered service mark of Sears Brands, LLC of Hoffman Estates, Ill.)

FIG. 1 shows a diagram of a system in accordance with one or more embodiments of the invention. The system includes a computer system (102), a user (150), one or more financial transaction sources (160), and an advertiser (170). The computer system (102) includes a financial transaction classification application (104), a storage repository (130), a processor (120), memory (122), an application interface (126), and, optionally, a security module (128). The financial transaction classification application (104) includes a classification engine (106), a category module (108), a calculator (110), a search module (112), and, optionally, an item equivalence module (114) and an advertisement module (116). The storage repository (130) includes text descriptions (132), category lists (134), prior results (136), algorithms (138), equivalent items lists (144), and advertisements (146). The algorithms (138) include search algorithms (140) and affinity algorithms (142). Each of these components is described below. Embodiments of the invention are not limited to the configuration shown in FIG. 1 and discussed herein.

In one or more embodiments of the invention, the computer system (102) is implemented according to a client-server topology. The computer system (102) may correspond to enterprise software running on one or more servers, and in some embodiments may be implemented as a peer-to-peer system, or resident upon a single computing system. In addition, the computer system (102) may be accessible from other machines using one or more application programming interfaces and/or user interfaces (not shown). In one or more embodiments of the invention, the computer system (102) may be accessible over a network connection (not shown), such as the Internet, by one or more users (e.g., advertiser, user, financial transaction source, etc.). Further, information and/or services provided by the computer system (102) may also be stored and accessed over the network connection.

Alternatively or additionally, in one or more embodiments of the invention, the computer system (102) may be a local computer system of the user (150), financial transaction sources (160), and/or advertisers (170). In such embodiments, the computer system (102) may, optionally, not be implemented using a client-server topology. For example, the computer system (102) may correspond to a laptop computer, desktop computer, mobile device, or another type of computing device, or combination of multiple computing devices. Additionally or alternatively, the computer system (102) may be a distributed computer system and/or multi-processor computer system in which the computer system includes multiple distinct computing devices.

Continuing with FIG. 1, the user (150) uses one or more financial transaction applications (not shown) to process the financial transactions that have been classified in accordance with one or more embodiments of the invention. Specifically, the user (150) may sell, offer to sell, auction, negotiate, or otherwise barter an item (e.g., good, service, currency) of a financial transaction. The user (150) may be a merchant, an individual, an agent, a broker, a consultant, a representative of a seller, or some similar entity capable of entering into a financial transaction.

In one or more embodiments of the invention, the user (150) may interact with the computer system (102). Specifically, the user (150) may send transaction information (e.g., a text description of the financial transaction), user preferences, settings, and/or feedback to the computer system (102). Transaction information may be any information (e.g., text description of an item, price, date, method of payment, counterparty, account number, category) associated with a financial transaction. The user (150) may send transaction information, user preferences, settings, and/or feedback to the computer system (102) in a number of manners (e.g., modes of communication), including but not limited to the mail, a telephone, email, fax, short message service, over the Internet, some other suitable mode for sending information, or any combination thereof. Further, the user (150) may receive a category for a financial transaction from the computer system (102). The transaction information, user preferences, settings, and/or feedback may be delivered automatically (e.g., according to a default setting, a consumer preference, an occurrence of an event) or on demand, for example, in response to a request from the computer system (102). The computer system (102) may interact with the user (150) in the same manner that the user (150) interacts with the computer system (102), or using different modes of communication. The user (150) may use a user system (not shown) (discussed below) to interact with the computer system (102) using software (not shown) in accordance with one or more embodiments of the invention.

In one or more embodiments of the invention, the user (150) interacts with a financial transaction source (160). Specifically, the user (150) may execute a financial transaction using a financial transaction source (160). For example, the financial transaction source (160) may facilitate the financial transaction associated with the user. As another example, the financial transaction source (160) may transfer funds for the financial transaction. Further, the user (150) may send transaction information (e.g., consent to proceed with a financial transaction), user preferences, settings, and/or feedback to a financial transaction source (160).

In one or more embodiments of the invention, the user (150) sends transaction information, user preferences, settings, and/or feedback to a financial transaction source (160) in a number of manners (e.g., modes of communication), including but not limited to the mail, a telephone, email, fax, short message service, over the Internet, some other suitable mode for sending information, or any combination thereof. Further, the user (150) may receive transaction information (e.g., confirmation of a purchase) from a financial transaction source (160). The transaction information, user preferences, settings, and/or feedback may be delivered automatically (e.g., according to a default setting, a consumer preference, an occurrence of an event) or on demand, for example, in response to a request from a financial transaction source (160). The financial transaction source (160) may interact with the user (150) in the same manner that the user (150) interacts with the financial transaction source (160), or using different modes of communication. The user (150) may use a user system (not shown) (discussed below) to interact with a financial transaction source (160) using software (not shown) in accordance with one or more embodiments of the invention.

In one or more embodiments of the invention, a financial transaction source (160) is an entity capable of creating and/or delivering transaction information (e.g., a text description) of a financial transaction associated with the user (150). Examples of a financial transaction source (160) include, but are not limited to, a vendor, a financial institution, and the user (150). A number of financial transaction sources (160) may be used to create and/or deliver the transaction information for a financial transaction associated with the user (150). For example, a financial transaction source (160) may be a physical source (e.g., a physical store, face to face) or a virtual source (e.g., online). Examples of types of financial transaction sources (160) include, but are not limited to, transaction sources (e.g., Amazon.com® website), auction sources (e.g., eBay® website), credit card companies, banks, and merchants. (Amazon.com® is a registered service mark of Amazon Technologies, Inc., of Reno, Nev.; eBay® is a registered service mark of eBay, Inc., of San Jose, Calif.)

In one or more embodiments of the invention, each financial transaction source (160) sends transaction information (e.g., text description of an item involved in a financial transaction) to, and receives information (e.g., a request for transaction information associated with a transaction of a user) from, the computer system (102). The transaction information may be delivered automatically (e.g., according to a default setting, a marketing entity preference, an occurrence of an event) or on demand, as from a request made by the computer system (102). Each financial transaction source (160) may interact with the computer system (102) in the same mode of communication that the computer system (102) interacts with a financial transaction source (160), or using different modes of communication. In one or more embodiments of the invention, each financial transaction source (160) uses a financial transaction source system (not shown) to interact with the computer system (102) using financial transaction source software (not shown) (discussed below).

Continuing with FIG. 1, in one or more embodiments of the invention, the advertiser (170) is an entity that creates and/or distributes advertisements that are associated with an item involved in a financial transaction categorized in one or more embodiments of the invention. For example, in one or more embodiments of the invention, the advertiser (170) selects one of a number of advertisements for a competing product to the item involved in a financial transaction.

In one or more embodiments of the invention, the advertiser (170) sends information (e.g., an advertisement) to, and receives information (e.g., an item involved in a financial transaction, a request for an advertisement, etc.) from, the computer system (102). The information may be delivered automatically (e.g., according to a default setting, a marketing entity preference, an occurrence of an event) or on demand, as from a request made by the advertiser (170). The advertiser (170) may interact with the computer system (102) in the same mode of communication that the computer system (102) interacts with the advertiser (170), or using different modes of communication. In one or more embodiments of the invention, the advertiser (170) uses an advertiser system (not shown) (discussed below) to interact with the computer system (102) using advertiser software (not shown) (discussed below).

The computer system (102) may also be implemented as a browser extension. In such a scenario, user software, financial transaction source software, and/or advertiser software may interact directly with the computer system (102) as a browser extension.

Continuing with FIG. 1, the computer system (102) is configured to interact with the user (150), each financial transaction source (160), and/or the advertiser (170) using an application interface (126) in accordance with one or more embodiments of the invention. Specifically, the application interface (126) of the computer system (102) is configured to receive input from and send output to the user (150), each financial transaction source (160), and/or the advertiser (170). The user (150), each financial transaction source (160), and/or the advertiser (170) may include an interface to receive data from and send data to the computer system (102). Examples of an interface may include, but are not limited to, a graphical user interface, an application programming interface, a keyboard, a monitor, a mouse, a web service, a data protocol adapter, some other hardware and/or software, or any suitable combination thereof.

In one or more embodiments of the invention, the information received by the application interface (126) includes, but is not limited to, transaction information, user preferences, settings, feedback, and advertisements. The information sent by the application interface (126) may include, but is not limited to, a request for transaction information, a category for an item involved in a financial transaction, and a request for an advertisement. The information sent by the application interface (126) may specify, but is not limited to, a user, an advertiser, a financial transaction source, a Uniform Resource Identifier (URI) (e.g., a Uniform Resource Locator (URL), a web address, etc.), a category identified by the confidence prediction engine (106), some other software or source of information, or any suitable combination thereof.

In one or more embodiments of the invention, the information (i.e., data) transferred among the application interface (126), the user (150), each financial transaction source (160), and/or the advertiser (170) corresponds to metadata associated with transaction information, user preferences, settings, feedback, and/or advertisements. In this case, the metadata may describe the data specified in the transaction information, user preferences, settings, feedback, and/or advertisements (i.e., the metadata may provide context for the specified data). In one or more embodiments of the invention, the computer system (102) is configured to support various data formats provided by the user (150), each financial transaction source (160), and/or the advertiser (170).

Continuing with FIG. 1, the computer system (102) is configured to retrieve and store text descriptions (132), category lists (134), prior results (136), algorithms (138), equivalent item lists (144), and advertisements (146). More specifically, the computer system (102) may be configured to use the classification engine (106) to retrieve and store text descriptions (132), category lists (134), prior results (136), algorithms (138), equivalent item lists (144), and advertisements (146) in the storage repository (130) in accordance with one or more embodiments of the invention.

In one or more embodiments of the invention, a text description includes one or more words that describe the item involved in the financial transaction. The text descriptions (132) of the storage repository (130) may include one or more text descriptions of one or more items involved in one or more financial transactions that have been previously categorized. Specifically, in one or more embodiments of the invention, each text description (132) provides an original text description of an item involved in a transaction and a search term used to categorize the item. The text descriptions (132) stored in the storage repository (130) may be associated with financial transactions involving the user or a number of users.

In one or more embodiments of the invention, the category lists (134) include a list of categories used when classifying a financial transaction. Specifically, each category list may be used to determine which categories are searched with a search term when classifying a financial transaction. A category may be a word or term used to identify a classification within a system. For example, for a system to track a household budget, categories may include food, clothes, charitable donations, utilities, phone, mortgage, car loan, student loan, and miscellaneous. As another example, for a system to track finances of a manufacturing plant, categories may include wages, insurance, rent, assets, and inventory.

In one or more embodiments of the invention, a category is part of a taxonomy. A taxonomy may be a hierarchy of categories. In other words, a category in a taxonomy may include one or more subcategories. A category may be defined by one of a number of category types. For example, a category may be defined by a product (e.g., books, golf) with subcategories (e.g., health books, fiction books, reference books, golf clubs, golf shoes, golf balls) for one or more of the categories. Categories defined by product may be based on a code (e.g., the United Nations Standard Product and Services Code), a vendor system (e.g., shopping departments at the Amazon.com® website), user preferences, or some other suitable classification system. (Amazon.com® is a registered service mark of Amazon Technologies, Inc. of Reno, Nev.) As another example, a category may be defined by an industry (e.g., legal services, clothing stores) with one or more subcategories (e.g., bankruptcy, divorce, wills/trusts, men's clothing stores, women's clothing stores) for one or more of the categories. Categories defined by industry may be based on a government classification system (e.g., the Standard Industry Classification, the North American Industry Classification System), a vendor system, user preferences, or some other suitable classification system.

Although taxonomies of categories in the above example are presented with only two levels in the hierarchy (i.e., category and subcategory), additional levels may exist without departing from the scope of the invention. Specifically, subcategories may have subcategories. For example, the category "clothing" may have a sub-category of "men's clothing", which has a sub-category of "men's shoes", which has a sub-category of "formal men's shoes", etc.

With respect to the taxonomy, categorizing by subcategory may allow the user to better track certain financial transactions. For example, a category of "food" used to track a household budget may include subcategories such as meat, snacks, and restaurants. A subcategory may have one or more of its own subcategories. Using the previous example, the subcategory "restaurants" may have subcategories of coffee shops, dine-in, and take out. A category list (134) may include a single category, multiple categories, a category with one or more subcategories, or any other suitable combination. The category lists (134) may be provided by the user (150), provided by a financial transaction source (160), generated by the financial transaction classification application (104), originate from some other suitable source, or any combination thereof. As shown in FIG. 1, multiple category lists may be defined. A separate list may exist for each user, each purpose of categorization, or a combination thereof in one or more embodiments of the invention. Category lists may be identified by a name or other designation assigned by default, by the user, or by some other entity. For example, a category list for tracking a household budget of the user may be identified as "User's household budget." The category lists (134) stored in the storage repository (130) may be associated with financial transactions involving the user or a number of users.

In one or more embodiments of the invention, the prior results (136) are the results of previous categorizations. Specifically, each prior result may link a category with a particular text description (with or without the associated search term) of a financial transaction that was successfully classified. The prior results (136) stored in the storage repository (130) may be associated with financial transactions involving the user or a number of users. For example, each user may have a corresponding set of prior results. Alternatively (or additionally), all users may share the same prior results. The prior results (136) may be generated for one or more users using the text descriptions (132), category lists (134), algorithms (138), equivalent item lists (144), and/or advertisements (146). The prior results (136) may be associated with various information, including but not limited to a particular user, one or more financial transactions, a text description for an item involved in a transaction, a search term, and a set of categories. The prior results may be a word (e.g., reject, accept), a number, some other suitable designation, or any combination thereof.

In one or more embodiments of the invention, the algorithms (138) include procedures used to conduct a search and to calculate an affinity score. In one or more embodiments of the invention, algorithm(s) are stored in the storage repository as software code in a software library, configuration parameters, definition file (e.g., extensible markup language (XML) document), or in another computer readable format. In one or more embodiments of the invention, an algorithm includes a procedure when the algorithm includes an identifier of software code for performing the steps, directly includes the series of steps, and/or may include other identifiers of the procedure. Rather than the algorithms being in the storage repository, the algorithms may be a part of the financial transaction classification engine.

The search algorithms (140) may include one or more procedures that may be used to conduct a search. Each search algorithm (140) may include a procedure used to conduct a search for a search term (described below) and at least one category. Specifically, for a given search term and/or category (or set of categories), a search algorithm (140) may include one or more search engines (e.g., Internet search engines) on which a search is conducted. A search engine may be a software program designed to search and gather information from one or more databases. The information gathered from the one or more databases may be based on one or more search terms. A search engine may search web pages, books, magazine articles, and/or other references.

In one or more embodiments of the invention, the search engine(s) used by a search algorithm are determined, in part, based on the search term (derived from the text description of the financial transaction) and/or the set of named categories. A named category is selected by the category module (described below) from a list of all categories. Each named category is determined to have a strong likelihood of being the category to which the search term is classified. As described below, the named categories may further be filtered at times. Ultimately, the category module selects the set of named categories to include the named categories deemed most likely to provide the correct category in which to classify the financial transaction.

As an example, a search algorithm (140) may determine that, for a search term of "donuts" and for categories of "food," "stationary," and "entertainment," the Google® search engine and the Yahoo! search engine should be used. (Google® is a registered service mark of Google, Inc., of Mountain View, Calif.; Yahoo!® is a registered service mark of Yahoo! Inc. of Sunnyvale, Calif.) Each search algorithm (140) may search for the search term, each of the set of named categories, and combinations thereof. For example, a search algorithm (140) may determine that, for a search term (donuts) and a set of named categories (food, stationary, and entertainment), a search shall be conducted on each of the Google® search engine and the Yahoo!® search engine for "donuts," "donuts and food," "donuts and stationary," "donuts and entertainment," "donuts or food," "donuts or stationary," "donuts or entertainment," "food," "stationary," and "entertainment." The affinity algorithm (described below) may use the results from each search performed using the search algorithm or from specific searches.

In one or more embodiments, the affinity algorithms (142) of the algorithms (138) in the storage repository (130) include a procedure used to calculate an affinity score. Specifically, each affinity algorithm (142) may determine how an affinity score is calculated using the results of the search conducted using a search algorithm (142). An affinity score may be an indication of the correlation between a search term and a category. In other words, an affinity score may indicate the likelihood that the item in the financial transaction should be classified in the category. An affinity score may be a number (e.g., 0.9, −0.75), a range of numbers, a letter, a word or set of words (e.g., strong match, unlikely match), a category, some other suitable indication, or any combination thereof. An affinity algorithm (144) may be a mathematical formula. For example, an affinity algorithm (144) may determine that an affinity score for a search term (e.g., donuts) and a category (e.g., food) is calculated as: $n(x \& y)/\sqrt{[n(x) \times n(y)]}$, where $n(x)$ is the number of search results (e.g., web pages) for "donuts", $n(y)$ is the number of search results "food", $n(x \& y)$ is the number of search results for "donuts and food", and sqrt is the square root function. As another example, an affinity algorithm may be the function: $\log \{n(x \& y)/[n(x) \times n(y)]\}$, where log is a logarithm.

In one or more embodiments of the invention, the equivalent item lists (144) include one or more equivalent items for an item involved in a financial transaction. The equivalent item lists (144) may include equivalent items that are more general than, equivalent to, and/or more narrow than the item of a financial transaction. For example, if the item involved in a financial transaction is shirt, a more general equivalent item may be clothes, an equivalent item that is equivalent to a shirt may be a blouse, and a narrower equivalent item may be an undershirt.

In one or more embodiments of the invention, the advertisements (146) include advertisements for an item and/or a competitor of the item involved in a financial transaction. Advertisements may be in one or more of a variety of forms, including but not limited to text, graphics, animation, and sound. The advertisements (146) may be received from one or more advertisers (170).

Continuing with FIG. 1, the storage repository (130) is a persistent storage device (or set of devices) that stores software and data used to classify a financial transaction using a search engine. In one or more embodiments of the invention, the storage repository (130) is configured to store the text descriptions (132), category lists (134), prior results (136), algorithms (138), equivalent item lists (144), and advertisements (146) in accordance with one or more embodiments of the invention. Examples of a storage repository (130) include, but are not limited to, a database (or a number of databases), a file system, a hard drive, some other form of data storage, or any suitable combination thereof. The storage repository (130) may be located on multiple physical machines, each storing all or a portion of the text descriptions (132), category lists (134), prior results (136), algorithms (138), equivalent item lists (144), and advertisements (146). Each storage unit or device may be physically located in the same or different geographic location.

The storage repository may be operatively connected to the financial transaction classification application (104). In one or more embodiments of the invention, the financial transaction classification application (104) includes functionality to classify a financial transaction using a search engine. More specifically, the financial transaction classification application (104) may be configured to receive, for example, transaction information, user preferences, settings, feedback, and advertisements from the application interface (126) and store the text descriptions, category lists, prior results, algorithms (such as search algorithms and affinity algorithms), equivalent item lists, and advertisements in the storage repository (130). The functions of the financial transaction classification application (104) may be performed on a single computing device or on multiple computing devices. When the functions of the financial transaction classification application (104) are performed on multiple computing devices, a number of configurations and/or frameworks may be used. The configurations and/or software frameworks may be designed to work with multiple data nodes and large quantities of data. One or more calculations performed by one or more components of the financial transaction classification application (104) may be performed on multiple machines operating in parallel, where the results from each machine may be combined to generate a result to the one or more calculations.

In one or more embodiments of the invention, the classification engine (106) of the financial transaction classification application (104) is configured to coordinate the category module (108), the calculator (110), the search module (112), the storage repository (130), and, optionally, the item equivalence module (114), the advertisement module (116), and the security module (128). Specifically, the classification engine (106) may be configured to coordinate the transfer of, for example, transaction information, user preferences, settings, feedback, and advertisements between the application interface (126), the storage repository (130), and the other components of the financial transaction classification application (104).

Further, the classification engine (106) may be configured to retrieve the text descriptions (132), category lists (134), prior results (136), algorithms (138), equivalent item lists (144), and advertisements (146) from, and send text descriptions, category lists, prior results, algorithms (such as search algorithms and affinity algorithms), equivalent item lists, and advertisements to the storage repository (130) for use by the classification engine (106) or by other components of the financial transaction classification application (104). The classification engine (106) may also be configured to retrieve text descriptions (132), category lists (134), prior results (136), algorithms (138), equivalent item lists (144), and advertisements (146) from the storage repository (130) to be sent to the user (150), one or more financial transaction sources (160), and/or one or more advertisers (170).

Continuing with FIG. 1, the classification engine (106) is configured to receive a text description for a search term. In one or more embodiments of the invention, a search term is a grouping of one or more words, derived from the text description of the financial transaction, for input into a search engine. Specifically, a search term as used herein includes single words and search phrases. The search term may be a simplified version of the text description. The search term may be the same as the text description. Examples of a search term include, but are not limited to, car, chair, boat, lamp, and chicken. A search term may be narrow or broad. A search term that is too broad or too narrow may not result in a correct or accurate classification into a category.

In one or more embodiments of the invention, the text description is one or more words and/or numbers used in combination to describe the financial transaction. A text description may originate from one of a number of sources, including but not limited to a purchase receipt, an invoice, a user (e.g., user-entered payment description, a user-entered inventory item description), a credit card statement, a transaction proposal, and an advertisement. The classification engine (106) may receive the text description for a financial transaction from the user (150) and/or a financial transaction source (160) through the application interface (126). The classification engine (106) may also process the text description to generate a search term.

In one or more embodiments of the invention, the classification engine (106) uses one or more algorithms to generate a search term from the text description. Examples of an algorithm include, but are not limited to, removing from the text description common words (e.g., the, a, an), removing adjectives, and removing prepositional phrases. For example, the classification engine (106) may receive a text description of "a blue rocking chair for the bedroom" for a financial transaction. In such a case, an algorithm may be used by the classification engine (106) to generate a search term of "rocking chair." The classification engine (106) may also use text descriptions (132) and/or prior results (136) from the storage repository (130), in conjunction with or independently of an algorithm, to generate a search term from the text description.

In one or more embodiments of the invention, more than one search term is generated from a text description for a financial transaction. For example, for a text description of "four quarts of motor oil and two gallons of milk," The resulting search terms may be "motor oil" and "milk." Further, a text description for a financial transaction may be too broad to create a search term. In such a case, the classification engine (106) may send a request to the source (e.g., the user (150), a financial transaction source (160)) of the transaction information (e.g., the text description), using the application interface (126), for clarification regarding the text description.

Further, more than one text description may exist for a single financial transaction. For example, multiple items, purchased in the same financial transaction, may each have a text description. In such a case, the classification engine (106) may treat each text description as an individual transaction. For example, a scanned receipt for purchases at a megamart includes a separate line for each item purchased. In this example, if one line item is "four boxes of cereal," a second line item is "megapack of toilet paper," a third line item is "shampoo," and a fourth line item is "case of beer," then the classification engine (106) may treat each line item as a separate transaction. Here, the classification engine (106) may generate search terms of "cereal," "toilet paper," "shampoo," and "beer."

In one or more embodiments of the invention, a text description may include a brand name. For example, a text description may be Scotch® brand tape or a Chevrolet® Malibu. (Scotch® is a registered trademark of 3M Company of St. Paul, Minn.; Chevrolet® is a registered trademark of General Motors LLC of Detroit, Mich.) In such a case, the classification engine (106) may be configured to recognize the brand name and create a search term. For example, the classification engine (106) may remove the brand name from the text description to create the search term. As another example, the classification engine (106) may recognize, using the text descriptions (132) and/or prior results (136) from the storage repository (130), brand names from competing products and/or services and use such competing brand names in generating the search term.

In one or more embodiments of the invention, the classification engine (106) is further configured to select a search algorithm to be used in conducting the search. Specifically, the classification engine (106) may be configured to evaluate the search algorithms (140) in the storage repository (130). The classification engine (106) may also be configured to select and retrieve one of the search algorithms that likely generates accurate results. Evaluation of the search algorithms (140) may involve a variety of criteria, including but not limited to historical performance of a particular search engine (as tracked by the classification engine (106) and/or reported by a third party source), the subject matter of the search term (e.g., a search terms with subject matter such as "prescription drug" may generate more accurate search results when industry-specific search engines, such as medscape.com, are used in the search algorithm), and the number of search engines used in the search algorithm.

In one or more embodiments of the invention, the classification engine (106) is further configured to adjust and/or create a search algorithm based on a number of factors, including but not limited to feedback (described below), performance of a particular search engine, and a new search engine. For example, if a search engine, based on an average quality rating (monitored by the classification engine (106) and/or an external source), performs below a predetermined performance threshold, then the classification engine (106) may eliminate the search engine from the search algorithm.

In one or more embodiments of the invention, the classification engine (106) is further configured to select an affinity algorithm to be used in calculating one or more affinity scores based on a search. Specifically, the classification engine (106) may be configured to evaluate the affinity algorithms (142) in the storage repository (130). The classification engine (106) may also be configured to select and retrieve one of the affinity algorithms that likely lead to a correct categorization of the text description of the financial transaction. Evaluation of the affinity algorithms (142) may involve a variety of criteria, including but not limited to historical performance of a particular affinity algorithm (as tracked by the classification engine (106), in terms of a particular search term subject matter and/or overall performance of the affinity algorithm), historical performance of a particular search engine, the subject matter of the search term, the particular search engines used in the search algorithm, and the number of search engines used in the search algorithm.

In one or more embodiments of the invention, the classification engine (106) is further configured to adjust and/or create an affinity algorithm based on a number of factors, including but not limited to feedback (described below), performance of a particular search engine used, and performance of the particular affinity algorithm. For example, if an affinity algorithm uses three search engines (search engine A, search engine B, search engine C), where one of those search engines (search engine A), based on an average quality rating, performs below a predetermined performance threshold, then the classification engine (106) may reduce the weight of the results from that particular search engine. In this example, the previously-used weighting of the search engines in the affinity algorithm may be 0.5 for search engine A, 0.3 for search engine B, and 0.2 for search engine C, where the weighting after an adjustment may be 0.3 for search engine A, 0.4 for search engine B, and 0.3 for search engine C. If performance of a search engine is noted to increase above a threshold, the weight of such search engine may also be adjusted upward within an affinity algorithm.

In one or more embodiments of the invention, the classification engine (106) is further configured to present, to the user, the text description of the item involved in a financial transaction and the target category (described below) having the target affinity score (described below). The classification engine (106) may present the text description and the target category using the application interface (126). The method and form of presenting the text description and the target category may be determined by default, by the user (150), or by some other entity.

In one or more embodiments of the invention, the classification engine (106) is further configured to receive feedback from the user. Specifically, the feedback received by the classification engine (106) through the application interface (126) may notify the classification engine (106) that the target category is correct or incorrect. The feedback may take a number of different forms, including but not limited to a response to a yes/no question from the classification engine (106) as to whether the target category is correct, a free-form text response from the user (for example, to state that the target category, search term, text description, some other aspect of the classification of the financial transaction (or any combination thereof) is incorrect), and a suggestion for a different named category, search term, or other factor used to classify the financial transaction.

If the feedback is that the target category is correct, then the classification engine (106) stores the results as prior results (136) in the storage repository (130). If the feedback is that the target category is incorrect, then the classification engine (106) may select a different search algorithm and/or affinity algorithm to generate a revised (and/or replacement) target category. Selecting a different search algorithm and/or affinity algorithm may be selecting a new search algorithm and/or affinity algorithm, or adjusting an existing search algorithm (e.g., replacing or omitting a search engine from the search algorithm) and/or affinity algorithm. Alternatively (or additionally), selecting a different search algorithm may include taking or following a different order of instructions within software code. For example, one search algorithm may be performing a series of steps twice, once for each of two different search engines, while another search algorithm may be performing the same series of steps three times, once for each of three different search engines. If the feedback is that the target category is incorrect, then the classification engine (106) may also create a new search term and/or request that the category module (108) generate a revised (and/or replacement) set of named categories (described below).

In one or more embodiments of the invention, the classification engine (106) further determines that financial transactions may be fraudulent based on the target category being rarely or never used. For example, the classification engine (106) may be preconfigured to count a number of times a target category classifies a financial transaction in a period of time. The classification engine (106) may establish that, when a target category that classifies financial transactions less than a threshold minimum number of times over a predefined duration of time is used to classify a particular financial transaction, the particular financial transaction may be fraudulent. When a financial transaction is classified to a target category that has less than the threshold minimum number of financial transactions categorized for the predefined duration of time, the classification engine (106) may be configured to trigger a fraud alert. In one or more embodiments of the invention, the threshold minimum number may be a percentage of total transactions or an integer. In such a case, the financial transaction may be fraudulent because it is outside of the normal categories to which a financial transaction is assigned. Specifically, the classification engine may determine that the financial transaction is fraudulent based on the category assigned by the classification engine being rarely or never used. When the classification engine (106) determines that the target category is rarely or never used, the classification engine (106) may also be configured to a fraud alert and display the fraud alert.

Continuing with FIG. 1, the category module (108) is configured to select a set of named categories for a given search term. The category module (108) may include and/or have access to all categories that may apply to embodiments of the invention. A named category may be a category determined to have a strong likelihood of being the category to which the search term is classified. As described below, at times a named category may further be filtered and eliminated as a named category. Ultimately, once the filtering of named categories is complete, the set of named categories is generated. The set of named categories may be categories selected from among the categories in the category lists (134) in the storage repository (130) and that are determined by the category module (108) to most likely be the correct category to which the financial transaction is to be classified. In other words, each named category in the set of named categories is used, along with the search term, in the search algorithm and, subsequently, the affinity algorithm.

In one or more embodiments of the invention, the category module (108) uses an algorithm, either stored within the category module (108) or the storage repository (130), to analyze the search term and select the set of named categories based on the search term. An algorithm may be set by default, based on user preferences, based on some other suitable factor, or any combination thereof. For example, if the search term is "donuts," then the algorithm used by the category module (108) may determine that the set of named categories may include food, stationary, and entertainment. The algorithm used by the category module (108) may determine that a category should be broader or narrower to be used in the set of named categories. For example, instead of food, the category module (108) may select the category of "snacks" for the set of named categories. The category module (108) may create, modify, or delete an algorithm, depending on a number of factors, including but not limited to historical performance of the algorithm and feedback received from the user and/or a financial transaction source.

In one or more embodiments of the invention, the category module (108) is also configured to create a new category, receive and store a new category, and/or modify an existing category, where such new category and/or modified existing category becomes part of the set of named categories. Such new category and/or modified existing category may also be stored in the category lists (134) in the storage repository (130).

In one or more embodiments of the invention, the category module (108) is also configured to select a revised (and/or replacement) set of named categories. Specifically, when the target category to which the financial transaction is classified is incorrect (as determined, for example, from feedback received from the user), the category module (108) may add a category to the set of named categories, delete a category from the set of named categories, create an entirely new set of named categories, or otherwise revise the set of named categories that were previously used for the search term. For example, if the previously-used set of named categories for the search term "bananas" was "food" and "entertainment," and if feedback from the user stated that the categories were too broad, then the category module (108) may create a revised (and/or replacement) set of named categories that include "snacks," "fruit," and "entertainment food."

The revised (and/or replacement) set of named categories may be used by the classification engine (106) to determine a revised (and/or replacement) search algorithm. To create the revised (and/or replacement) set of named categories, the category module (108) may evaluate the affinity score for each named category from the set of named categories and revise the set of named categories based on one or more of the affinity scores for each named category. For example, if the affinity score for "bananas" and "entertainment" is 0.2, the category module (108) may be determine that the affinity score is too low and create a revised (and/or replacement) set of named categories by removing "entertainment" and adding "fitness."

Continuing with FIG. 1, the search module (112) of the financial transaction classification application (104) is configured to conduct a search for the search term and each named category in the set of named categories. The search module (112) may conduct multiple searches in a variety of combinations. For example, the search module (112) may search for the search term and each named category in the set of named categories individually (e.g., only the search term), in some combination (e.g., the search term and a named category, a search term or a named category), or any suitable combination thereof. The search module (112) may conduct each search according to the affinity algorithm chosen by the classification engine (106). For example, the affinity algorithm may require a search of the search term and a named category.

In one or more embodiments of the invention, the search module (112) is also configured to process the results of each search. Processing the result of a search may be performed according to the search algorithm. For example, the search module (112) may process the results of each search by counting the number of results (e.g., web pages) that contain the terms (e.g., search term, named category) used in the search. Each result may be actually counted by the search module (112). Each result may also be set equal to the number of results reported for the search by the search engine used. The result of a search may also be processed in some other suitable manner, including but not limited to counting each web page in which the search terms appear at least ten times, only considering web pages that are no more than two years old, not counting web pages on a pre-determined list of excluded web pages, and only counting web pages from a list of pre-approved web pages.

In one or more embodiments of the invention, the search module (112) is also configured to conduct a second (i.e., additional) search based on a revised (and/or replacement) search term, a revised (and/or replacement) set of named categories, a revised (and/or replacement) search algorithm, and/or a revised (and/or replacement) affinity algorithm. The search module (112) may further be configured to process the results of the second search.

Continuing with FIG. 1, the calculator (110) is configured to calculate each affinity score in accordance with one or more embodiments of the invention. Each affinity score calculated by the calculator (110) may be based on the affinity algorithm designated for a particular search. An affinity score may be calculated by the calculator (110) for each named category in the set of named categories. An affinity score may be calculated using, among other factors, a named category, a revised (and/or replacement) named category, a search term, a revised (and/or replacement) search term, a search algorithm, and/or a revised (and/or replacement) or second search algorithm.

In one or more embodiments of the invention, the calculator (110) is further configured to evaluate each affinity score. Evaluating the affinity scores may include using a target affinity score. For example, the calculator (110) may determine, based on the affinity scores calculated using the affinity algorithm, one or more affinity scores having a target affinity score. The target affinity score may be the highest of the affinity scores calculated by the calculator (110) using the affinity algorithm. Alternatively, depending on the affinity algorithm, the target affinity score may be the lowest value. For example, the target affinity score may be alpha, numeric, alpha-numeric, or another type of score. The target affinity score may also be a predetermined affinity score or range of predetermined affinity scores. For example, if the affinity score for "tape and food" is 0.0044, the affinity score for "tape and stationary" is 0.0057, and the affinity score for "tape and entertainment" is 0.0024, then the calculator (110) selects the target category as "stationary" because "tape and stationary" produced the target (in this case, highest) affinity score.

Optionally, in one or more embodiments of the invention, the item equivalence module (114) is configured to determine an equivalent text description of an equivalent item. Specifically, in cases where the text description (and, consequently, the search term) of an item involved in the financial transaction is too narrow (e.g., too few web pages in the results of the search algorithm), than the item equivalence module (114) determines another item that is equivalent to the item involved in the financial transaction. For example, if the text description of the item is parasol, than the item equivalence module (114) may determine that an equivalent text description for an equivalent item is "umbrella." The item equivalence module (114) may retrieve one or more equivalent items from the equivalent items list (144) of the storage repository (130). Further, when the item equivalence module (114) creates an equivalent item, such newly created equivalent item may be stored in the equivalent items list (144) of the storage repository (130). In one or more embodiments of the invention, the equivalent text description is sent to the classification engine (108) to determine a revised (and/or replacement) search term that incorporates the equivalent text description with the original text description.

Optionally, in one or more embodiments of the invention, the advertisement module (116) is configured to select an advertisement associated with the item of a financial transaction. Specifically, an advertiser (170) may submit an advertisement to the computer system (102), where such advertisement is stored in the advertisements (146) of the storage repository (130). When a financial transaction being classified corresponds (e.g., an advertisement is for the item involved in the financial transaction, an advertisement is for a competing item to the item involved in the financial transaction) to an advertisement, the advertisement module (116) may retrieve the advertisement from advertisements (146) and sends the advertisement to the classification engine (106) to be displayed to the user (150). The advertisement module (116) may determine the advertisement and/or the advertiser with the advertisement based on the text description, the search term, the revised (and/or replacement) search term, or based on some other suitable description of the item involved in the financial transaction.

Continuing with FIG. 1, the processor (120) within the computer system (102) is configured to execute software in accordance with one or more embodiments of the invention. Specifically, the processor (120) may be configured to execute the computer system (102) or any of the engines, modules, calculators, and repositories described above and shown in FIG. 1, as well as software used by the user (150), one or more financial transaction sources (160), and/or one or more advertisers (170). The processor (120) may be an integrated circuit, a central processing unit, a multi-core processing chip, a multi-chip module including multiple multi-core processing chips, or other hardware processor. The processor (120) may be known by other names, including but not limited to a computer processor, a microprocessor, a hardware processor, and a multi-core processor. In one or more embodiments of the invention, the processor (120) is configured to execute software instructions stored in memory (122). The memory (122) may include one or more cache memories, main memory, and/or any other suitable type of memory. The memory (122) may be discretely located on the computer system (102) relative to the processor (120). In certain configurations, the memory (122) may also be integrated with the processor (120).

Optionally, in one or more embodiments of the invention, the security module (128) is configured to secure interactions between the computer system (102) and the user (150), a financial transaction source (160), and/or an advertiser (170). More specifically, the security module (128) may be configured to authenticate communication from software based on security keys verifying the identity of the source of the communication. For example, user software may be associated with a security key enabling the user software to interact with the computer system (102). Further, the security module (128) may be configured to restrict requests for information (e.g., confirmation of a target category, feedback), as well as access to information. For example, the user software may be restricted to only access a request to confirm a target category associated with a financial transaction for a specific user. Further, the user software may be restricted to provide only particular feedback associated with a user.

The user software, financial transaction source software, and/or advertiser software may be configured to interact with the computer system (102) using a browser extension. In this case, the browser extension may maintain an active session with the computer system (102) after the security module (128) has authenticated the user software, financial transaction source software, and/or advertiser software. For example, the browser extension may continue to interact with the computer system (102) as the user views various web content in the user software. In this example, the browser extension may receive notifications from the computer system (102) for presenting to the user (150).

As discussed above, the user, financial transaction sources, and advertiser may use a user system, financial transaction source system, and advertiser system, respectively. One or more of the user system, financial transaction source system, and advertiser system may be, or may contain a form of, an Internet-based or an intranet-based computer system that is capable of communicating with the applicant software. A computer system may include any type of computing device and/or communication device, including but not limited to computer system (102). Examples of the user system, financial transaction source system, and advertiser system may include, but are not limited to, a desktop computer with Internet or intranet access, a laptop computer with Internet or intranet access, a smart phone, a server, a server farm, and a personal digital assistant (PDA). The user system, financial transaction source system, and/or advertiser system may correspond to a computer system as described below with regard to FIG. 2.

Further, as discussed above, the user system, financial transaction source system, and/or advertiser system may each have corresponding software (e.g., user software, financial transaction source software, and advertiser software, respectively). The user software, financial transaction source software, and advertiser software, may execute on a separate device (e.g., a server, mainframe, desktop personal computer (PC), laptop, personal desktop assistant (PDA), television, cable box, satellite box, kiosk, telephone, mobile phone, or other computing devices) from the computer system (102), the user (150), the one or more financial transaction sources (160), and/or the one or more advertisers (170), and may be coupled by a network (e.g., Internet, Intranet, Extranet, Local Area Network (LAN), Wide Area Network (WAN), or other network communication methods), with wire and/or wireless segments. The user software may also be part of, or operate separately but in conjunction with, the computer system (102) and/or the one or more financial transaction sources (170).

In one or more embodiments of the invention, one or more of the user software, financial transaction source software, and advertiser software, is configured to display web page(s) (i.e., web content). More specifically, the user software, financial transaction source software, and advertiser software, may be any software capable of rendering Hypertext Markup Language (HTML) in one or more embodiments of the invention. For example, the user software, financial transaction source software, and advertiser software, may be a web browser(s) used by the corresponding system to access web pages (i.e., web content) over the Internet (or other Wide Area Network or Local Area Network). One or more of the user software, financial transaction source software, and advertiser software, may also be configured to display data in other formats, including but not limited to JavaScript®, JavaScript® Object Notation (JSON) and XML. (JavaScript is a registered trademark and service mark of Oracle America, Inc. of Redwood Shores, Calif.)

In one or more embodiments of the invention, one or more of the user software, financial transaction source software, and advertiser software, provides support for browser extension(s). More specifically, one or more of the user software, financial transaction source software, and advertiser software, may provide an open framework (i.e., software design that allows for easy removal, addition, and/or replacement of software components) for adding features to the user software, financial transaction source software, and/or advertiser software. In this case, a browser extension may be an application that extends the functionality of the software using the open framework. The user software may interact with the computer system (102) and/or the one or more financial transaction sources (160) using the browser extension(s). Further, the browser extension(s) may be configured to interact with a user interface of the user software (as well as a financial transaction source interface of financial transaction source software, and an advertiser interface of advertiser software).

Figure 2:
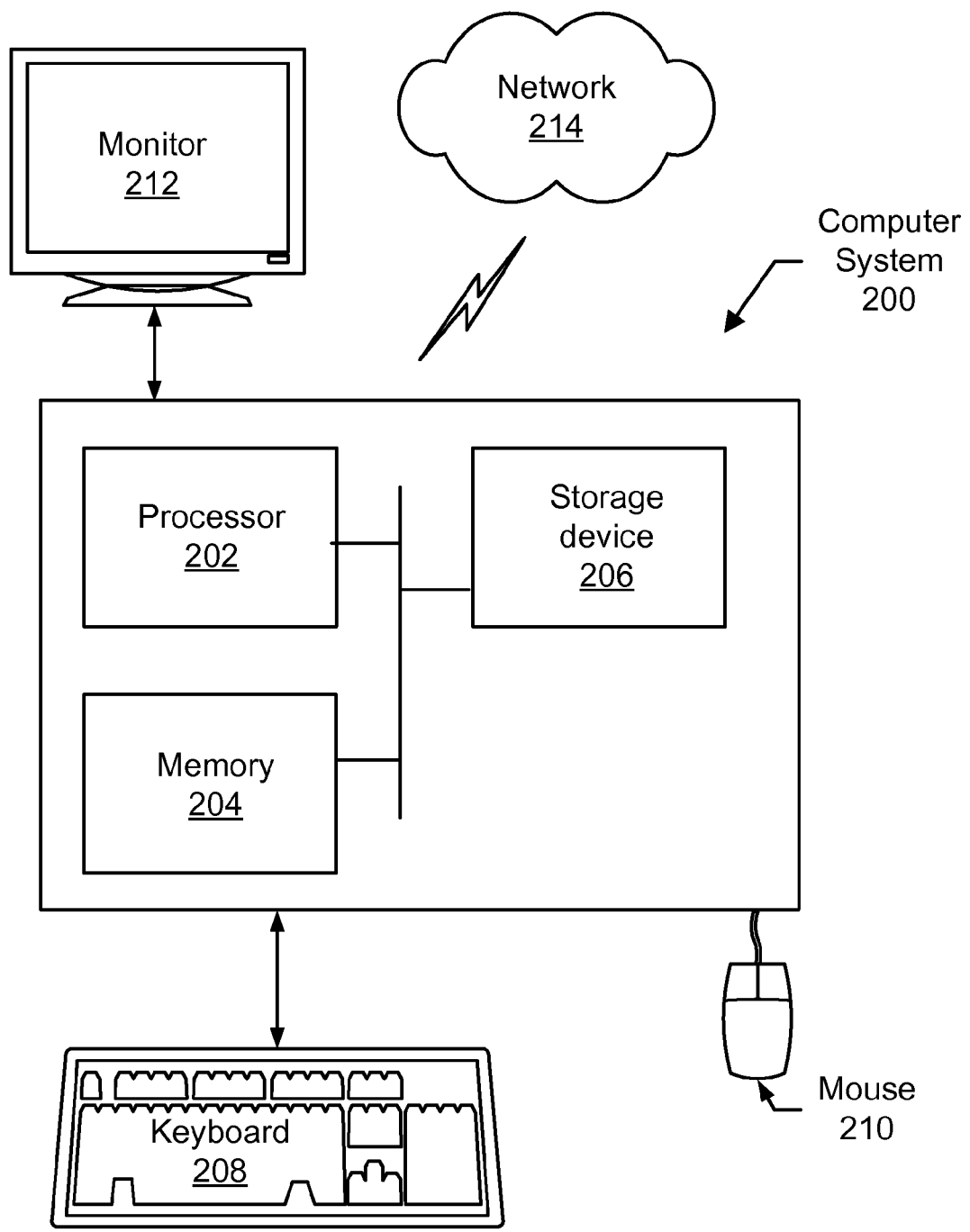
FIG. 2 shows a computer system in accordance with one or more embodiments of the invention.

FIG. 2 shows a computer system (200) on which one or more embodiments of a system (e.g., the user system, an advertiser system, a financial transaction source system, as described above with respect to FIG. 1) may be implemented. The computer system (200) of FIG. 2 may be virtually any type of computer regardless of the platform being used. For example, as shown in FIG. 2, the computer system (200) includes one or more processor(s) (202) such as an integrated circuit, a central processing unit (CPU), or other hardware processor, associated memory (204) (e.g., random access memory (RAM), cache memory, flash memory, etc.), a storage device (206) (e.g., a hard disk, an optical drive such as a compact disk drive or digital video disk (DVD) drive, a flash memory stick, etc.), and numerous other elements and functionalities typical of today's computers (not shown). The computer system (200) may also include input means, such as a keyboard (208), a mouse (210), or a microphone (not shown). Further, the computer system (200) may include output means, such as a graphical display (212) (e.g., a liquid crystal display (LCD), a light-emitting diode (LED) display, a plasma display, or cathode ray tube (CRT) monitor). The computer system (200) may be connected to a network (214) (e.g., a local area network (LAN), a wide area network (WAN) such as the Internet, or any other similar type of network) via a network interface connection (not shown). Many different types of computer systems exist, and the aforementioned input and output means may take other forms, now known or later developed. Generally speaking, the computer system (200) includes at least the minimal processing, input, and/or output means necessary to practice embodiments of the invention.

Further, one or more elements of the aforementioned computer system (200) may be located at a remote location and connected to the other elements over a network. Further, embodiments of the invention may be implemented on a distributed system having a plurality of nodes, where each portion of the invention (e.g., classification engine, category module, calculator) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

Figure 3A:
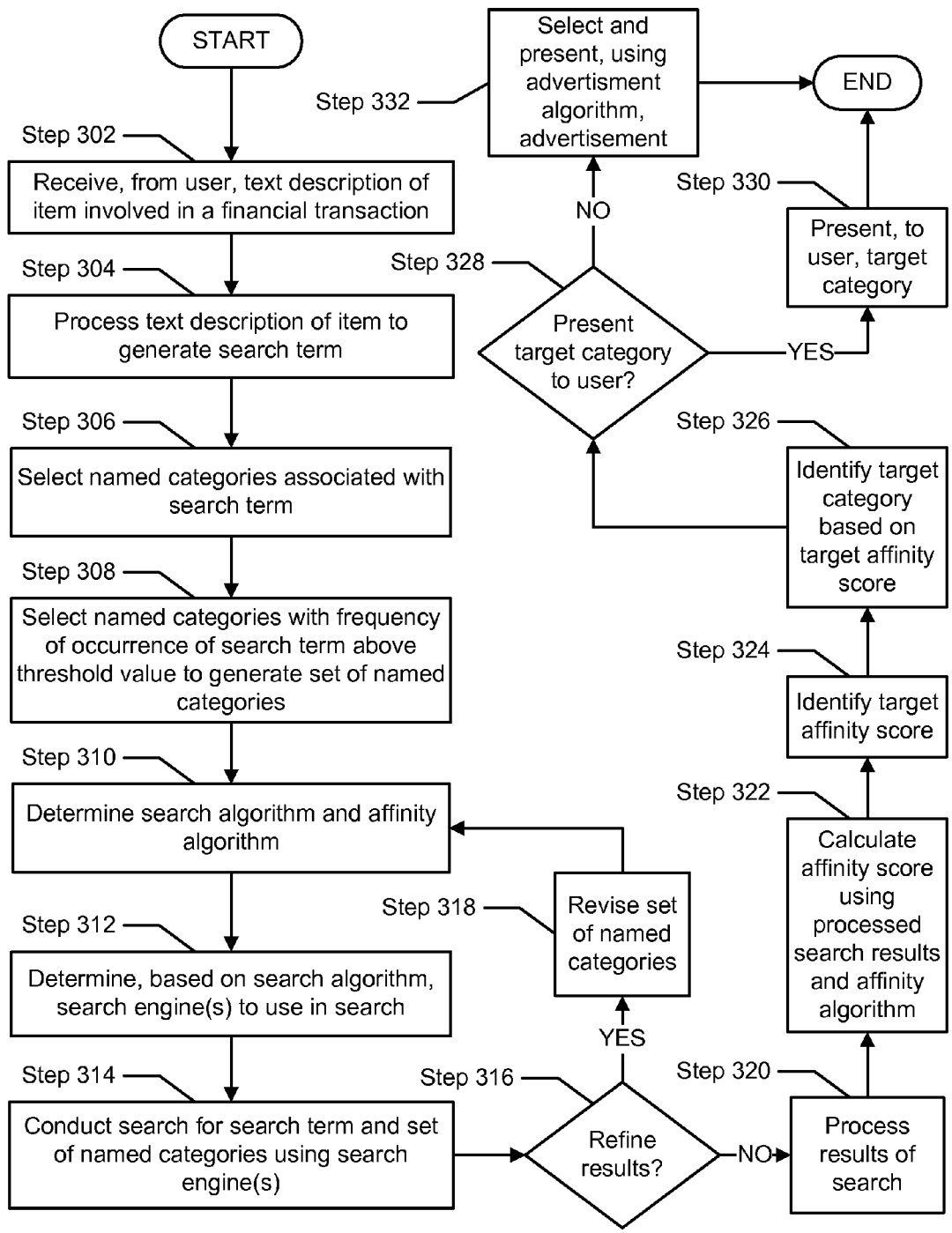
FIGS. 3A and 3B each show a flowchart of a method in accordance with one or more embodiments of the invention.
Figure 3B:
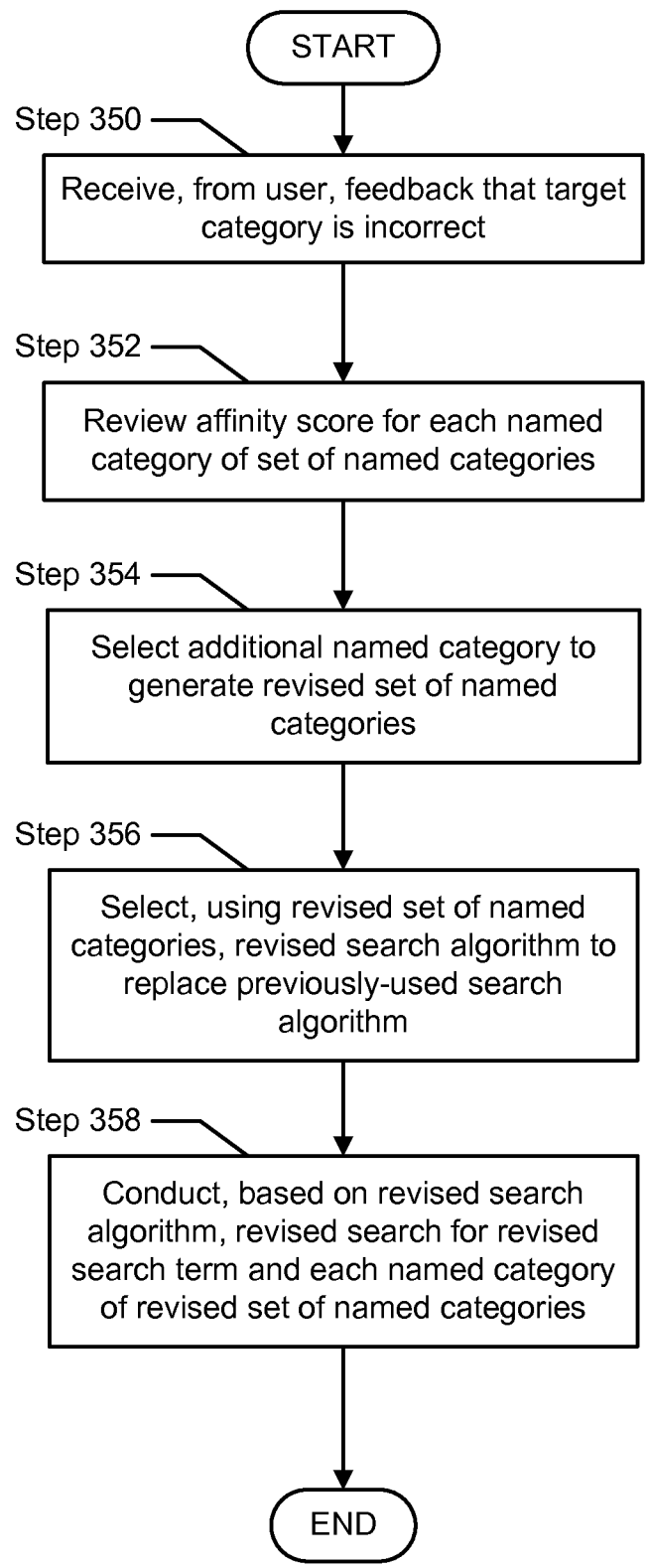

FIGS. 3A and 3B show flowcharts of a method for classifying a financial transaction using a search engine in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 3A and 3B, may be included in performing this method. Accordingly, the specific arrangement of steps shown in FIGS. 3A and 3B should not be construed as limiting the scope of the invention.

Referring to FIG. 3A, in Step 302, a text description of an item involved in a financial transaction is received. The text description (e.g., one or more words describing the item) may be received electronically (e.g., using software, scanned from paper format) from the user or a financial transaction source, may be entered manually by the user or an agent of the user, or may be received in any other suitable manner. In one or more embodiments of the invention, a particular computing device, as described, for example, in FIG. 2 above, is used to receive the text description of the item involved in the financial transaction. Further, the financial transaction may be any transaction or exchange (whether for or without consideration, current or prospective, etc.) made by a user. The financial transaction may involve a good, a service, currency, some other suitable transaction item, or any combination thereof.

In Step 304, the text description of the item is processed to generate a search term. In one or more embodiments of the invention, an algorithm is used to derive the search term from the text description. As discussed above, the algorithm may perform one or more functions, such as removing from the text description common words (e.g., the, a, an), removing adjectives, and removing prepositional phrases from the text description. If a search term is determined to be overly narrow or broad, the search term may be revised (and/or replaced) to generate a revised (and/or replacement) search term. In one or more embodiments of the invention, a particular computing device, as described, for example, in FIG. 2 above, is used to process the text description of the item to generate a search term.

In Step 306, named categories associated with the search term are selected. In one or more embodiments of the invention, a named category is selected as a viable category into which the financial transaction may be classified. One or more named categories may be selected. The named categories may be selected according to one of a number of algorithms. If more than one algorithm exists to select the named categories, one of the algorithms may be chosen based on the search term, past performance of an algorithm, user preferences, the system for which the financial transaction is being classified, some other suitable factor, or any combination thereof. Each algorithm may function according to user preferences, default settings, prior experience with the search term, some other factor, or any suitable combination thereof. For example, an algorithm may initially evaluate all categories in a category list as named categories. Alternatively, an algorithm may recognize the search term and select certain categories as named categories. For example, if the search term is "ice cream," then an algorithm may select the named categories as "novelties," "desert," "entertainment," "discretionary," "dairy," "freezer," and "calories." In some cases, the named categories selected in this Step 306 may be the set of named categories (described below), thus skipping Step 308. The named categories may be selected from a list of categories. One or more categories in the list of categories may include one or more sub-categories and/or a parent category. For purposes of this Step 306, a named category may include a sub-category and/or a parent category. In one or more embodiments of the invention, a particular computing device, as described, for example, in FIG. 2 above, is used to select the named categories associated with the search term.

In Step 308, the named categories having a frequency of occurrence above a threshold value are selected to generate a set of named categories. In one or more embodiments of the invention, the set of named categories are the one or more named categories that are determined to be most likely to properly classify the search term. This Step 308 generates a filter to eliminate a named category that has a lower chance of classifying the search term. For example, if there are ten named categories from Step 306, a search is conducted according to an algorithm using each of the named categories and the search term. The algorithm may be the search algorithm described below with respect to Step 310. For example, the algorithm may perform a search on a single designated search engine for each named category paired with the search term. Named category-search term pairs that generate more than a threshold value of search results (e.g., 15 million search results) may be selected as the set of named categories. Alternatively, the named category-search term pairs with the three highest search results (i.e., the threshold value is the third highest search result) may be selected as the set of named categories. In one or more embodiments of the invention, a particular computing device, as described, for example, in FIG. 2 above, is used to select the named categories having a frequency of occurrence above a threshold value to generate the set of named categories.

In Step 310, the search algorithm and the affinity algorithm is determined. In one or more embodiments of the invention, the search algorithm and/or the affinity algorithm is based on the search term and/or the set of named categories. The search algorithm and/or affinity algorithm may be selected from a set of pre-approved search algorithms and/or affinity algorithms. The search algorithm may specify or suggest one or more search engines to use based on the search term and the set of named categories. In one or more embodiments of the invention, the affinity algorithm uses the results of the search conducted according to the search algorithm to provide a measure of confidence with regard to classifying the search term in a category. In one or more embodiments of the invention, a particular computing device, as described, for example, in FIG. 2 above, is used to determine the search algorithm and the affinity algorithm.

In Step 312, the search engines to use in the search are determined based on the search algorithm. One or more search engines may be used in the search. The one or more search engines may be determined according to whether the search engines comply with minimum requirements. The requirements may be based on factors including, but not limited to, historical performance, an amount of use of the search engine, a number of results generated by the search engine, and the specificity or generality of the search engine relative to the search term and/or named category. In one or more embodiments of the invention, a particular computing device, as described, for example, in FIG. 2 above, is used to determine, based on the search algorithm, the search engines to use in the search.

In Step 314, a search is conducted for the search term and the set of named categories using the search engines. The search may actually be a series of searches conducted according to the search algorithm. For example, for each of three different search engines, a search may be conducted for the search term, named category A, named category B, named category C, the search term and named category A, the search term and named category B, and the search term and named category C. In one or more embodiments of the invention, each named category paired with the search term in at least one search for each search engine. The pairings and/or searches for each search engine may be determined based on the affinity algorithm. In one or more embodiments of the invention, a particular computing device, as described, for example, in FIG. 2 above, is used to conduct each search for the search term and the set of named categories using the search engines.

In Step 316, a determination is made as to whether the results of the searches should be refined. Results of the searches may need refining if the results are inconsistent with expectations. For example, the results of the search may need refining if there are too few search results on a search engine, there are too many search results of a search on a search engine that are older than a certain threshold, and the results are inconsistent (e.g., there are more results for a search of "donuts food" than there are for a search of "donuts."). If the results of the search should be refined, then the process proceeds to Step 318. If the results of the search should not be refined, then the process proceeds to Step 320. In one or more embodiments of the invention, a particular computing device, as described, for example, in FIG. 2 above, is used to determine whether the results of the searches should be refined.

In Step 318, the set of named categories is revised. The set of named categories may be revised (and/or replaced) by replacing one or more of the named categories with other categories, by eliminating one or more named categories from the set of named categories, by modifying the algorithm used to determine the set of named categories, by using some other suitable method, or any combination thereof. The taxonomy of categories may be traversed when the set of named categories is revised. For example, a named category may be replaced by a subcategory of the named category. A named category may also be replaced by a parent of the named category. Further, the search term may also be revised and/or replaced. In addition, a new search algorithm and/or affinity algorithm may be used. In one or more embodiments of the invention, a particular computing device, as described, for example, in FIG. 2 above, is used to revise the set of named categories. After Step 318 is completed, the process reverts to Step 310.

In Step 320, the results of the search are processed. Processing the results may put the results of the various searches into a format usable for the affinity algorithm. For example, processing may involve counting a number of web pages, books, magazine articles, and/or other references that generated a match in the search. In one or more embodiments of the invention, processing the results of the search involves counting a number of web pages for each search, where each search includes the search term and/or a named category of the set of named categories. The results of the search may be processed in other ways and/or by using filters. For example, search results may be filtered by processing web pages that have been posted within the past twelve months and/or that come from one of a list of pre-approved web sites. Examples of processing the results of the search in other ways include, but are not limited to counting web pages that have at least ten occurrences of the search term. In one or more embodiments of the invention, a particular computing device, as described, for example, in FIG. 2 above, is used to process the results of the search.

In Step 322, an affinity score is calculated using the processed search results and the affinity algorithm. In one or more embodiments of the invention, a separate affinity score is calculated for each named category in the set of named categories using the processed search results. Specifically, the processed search results (or portions thereof) associated with a named category are used as inputs to the affinity algorithm. For example, if the affinity algorithm is a mathematical formula having three inputs (the search results for the search term, the search results for a named category, and the search results for the search term and the named category), then the three search results performed on the search engine are used to calculate the affinity score for that named category. Further, the search results of any other searches (e.g., search results for the search term or the named category, search results for another named category) are not used to calculate the affinity score for that affinity score. The affinity score may be calculated in a number of ways.

For example, one method for calculating the affinity score is to use an affinity matrix. Specifically, an affinity matrix may be compiled, where each element of the matrix represents a search result between the search term and each named category of the set of named categories. Then, applying some algorithm (e.g., the Pearson product-moment correlation coefficient) to the affinity matrix, the affinity score for each named category is determined.

The affinity algorithm may include a weighting system that is applied to the results of each of the search engines used in the search algorithm. For example, if three search engines (search engine A, search engine B, and search engine C) are used, then the affinity algorithm may dictate that the results of search engine A be weighted 50%, the results of search engine B be weighted 30%, and the results of search engine C be weighted 20%. In one or more embodiments of the invention, a particular computing device, as described, for example, in FIG. 2 above, is used to calculate the affinity score for using the processed search results and the affinity algorithm.

In Step 324, a target affinity score is identified. In one or more embodiments of the invention, the target affinity score is a threshold used to determine which named category of the set of named categories are most likely to correctly classify the financial transaction. The target affinity score may be in a format that is substantially similar to the format of the affinity score. The target affinity score may be the highest of the affinity scores calculated using the affinity algorithm. The target affinity score may also be a predetermined affinity score or range of predetermined affinity scores. In one or more embodiments of the invention, a particular computing device, as described, for example, in FIG. 2 above, is used to identify the target affinity score.

In Step 326, a target category is identified based on the target affinity score. In one or more embodiments of the invention, the target category is the named category of the set of named categories that is most likely to correctly classify the financial transaction. The target category may be the named category that has the affinity score that matches the target affinity score. The target category may be the named category that has the affinity score that exceeds the target affinity score. For example, if the affinity score for "tape and food" is 0.0044, the affinity score for "tape and stationary" is 0.0057, and the affinity score for "tape and entertainment" is 0.0024, then the named category "stationary" is selected because "tape and stationary" produced the target (in this case, highest) affinity score. In one or more embodiments of the invention, a particular computing device, as described, for example, in FIG. 2 above, is used to identify the target category based on the target affinity score.

In Step 328, a determination is made as to whether the target category is presented to the user. Such a determination may be based on one or more of a number of factors, including but not limited to a user preference, a user request, and a default setting. If the target category is presented to the user, then the process proceeds to Step 330. If the target category is not presented to the user, then the process proceeds to Step 332. In one or more embodiments of the invention, a particular computing device, as described, for example, in FIG. 2 above, is used to determine whether the target category is presented to the user.

In Step 330, the target category is presented to the user. In one or more embodiments of the invention, the target category is presented with the text description of the financial transaction. In one or more embodiments of the invention, a particular computing device, as described, for example, in FIG. 2 above, is used to present the target category to the user. If the user determines that the target category for the financial transaction is correct, then the process ends after completing Step 330.

In Step 332, an advertisement, using an advertisement algorithm, is selected and presented. In one or more embodiments of the invention, the selected advertisement is based on the advertisement advertising a product in the target category. The selected advertisement may be selected from among a number of advertisements received from one or more advertisers. The advertisement may be a single advertisement or multiple advertisements. The advertisements may be of one or more of a number of types (e.g., banner ad, video, animated graphic, recording, coupon). The advertisement algorithm may select one or more advertisements to present to the user based on a number of factors. Such factors may include, but are not limited to, the target category, an amount of money paid by an advertiser for submitting an advertisement, the relevance of the advertisement to the target category, and whether the item of the financial transaction is made by a manufacturer submitting an advertisement.

For example, a financial transaction may be for a box of disposable diapers, and the resulting target category may be "baby products." Based on the target category being "baby products," the advertisement algorithm identifies advertisements that advertise products in the baby products category. From the identified advertisements, the advertisement algorithm may select, from among a number of advertisements, a banner ad for Pampers® diapers and a coupon for Gerber® baby food. (Pamper's® is a registered trademark of the Procter & Gamble Company of Cincinnati, Ohio; Gerber® is a registered trademark of Societe Des Produits Nestle, S.A. of Vevey, Switzerland.) The banner ad and the coupon are then presented to the user. The Pamper's® diapers ad may be selected over an ad for Huggies® diapers because Procter & Gamble paid more for its advertisement. (Huggies® is a registered trademark of Kimberly-Clark Worldwide, Inc. of Neenah, Wis.) In one or more embodiments of the invention, a particular computing device, as described, for example, in FIG. 2 above, is used to present the advertisement to the user. Once the advertisement is presented to the user, the process may end. Optionally, the target category, as described above with respect to Step 330, may be presented in conjunction with the advertisement.

Referring to FIG. 3B, in Step 350, feedback is received from the user that the target category is incorrect. The feedback may be received in response to a request for the user to accept the target category for the financial transaction. The feedback may also be unsolicited. The feedback may be a free-form text response, an answer to a yes/no question, some other form of feedback, or any combination thereof. In one or more embodiments of the invention, a particular computing device, as described, for example, in FIG. 2 above, is used to receive the feedback from the user that the target category is incorrect.

In Step 352, the affinity score for each named category of the set of named categories is evaluated. In one or more embodiments of the invention, evaluating the affinity score for each named category may lead to a determination that a revised or replaced affinity algorithm is warranted. The affinity algorithm may be revised in a number of ways, including but not limited to modifying the weighting of the search engines used in the search and modifying a mathematical formula of the affinity algorithm. Further, the target affinity score may be evaluated. The revised (and/or replaced) affinity algorithm and/or revised (and/or replaced) target affinity score may be determined in a manner substantially similar to the manner in which the previously-used affinity algorithm and/or target affinity score are determined, as described above with respect to Steps 310 and 324, respectively. In one or more embodiments of the invention, a particular computing device, as described, for example, in FIG. 2 above, is used to evaluate the affinity score for each named category of the set of named categories.

In Step 354, an additional named category is selected to generate a revised (and/or replacement) set of named categories. In one or more embodiments of the invention, the revised (and/or replacement) set of named categories may be generated in a manner substantially similar to the manner in which the previously-used set of named categories is generated, as described above with respect to Steps 306 and 308. A revised (and/or replacement) set of named categories may add one or more additional named categories and/or remove one or more previously-used named categories. In one or more embodiments of the invention, the target category that the user determined to be incorrect is removed from the revised (and/or replacement) set of named categories.

Further, a revised (and/or replacement) search term may also be generated to replace the previously-used search term. In one or more embodiments of the invention, the revised (and/or replacement) search term may be generated in a manner substantially similar to the manner in which the previously-used search term is generated, as described above with respect to Step 304. The revised (and/or replacement) search term may be broader than, narrower than, or otherwise different from the previously-used search term. In one or more embodiments of the invention, a particular computing device, as described, for example, in FIG. 2 above, is used to select an additional named category to generate a revised (and/or replacement) set of named categories.

In Step 356, a revised (and/or replacement) search algorithm may be selected, using the revised (and/or replacement) set of named categories, to replace the previously-used search algorithm. In one or more embodiments of the invention, the revised (and/or replacement) search algorithm may be generated in a manner substantially similar to the manner in which the previously-used search algorithm is generated, as described above with respect to Step 310. The revised (and/or replacement) search algorithm may include one or more additional search engines and/or remove one or more previously-used search engines. In one or more embodiments of the invention, a particular computing device, as described, for example, in FIG. 2 above, is used to select a revised (and/or replacement) search algorithm to replace the previously-used search algorithm.

In Step 358, a revised (e.g., second, additional, new) search is conducted, based on the revised (and/or replacement) search algorithm, for the revised (and/or replacement) search term and each named category of the revised (and/or replacement) set of named categories. In one or more embodiments of the invention, the revised search may be conducted in a manner substantially similar to the manner in which the previously-used search is conducted, as described above with respect to Step 314. A revised (and/or replacement) search algorithm may include one or more additional search engines and/or remove one or more search engines from the previously-used search algorithm. Further, the process may proceed, in a manner substantially similar to Steps 316-328 in FIG. 3A, to present a revised target category to the user. In one or more embodiments of the invention, a particular computing device, as described, for example, in FIG. 2 above, is used to conduct the revised search for the revised (and/or replacement) search term and each named category of the revised (and/or replacement) set of named categories. If the user provides feedback to the revised target category, the process may revert to Step 350 (for example, if the feedback is that the revised target category is incorrect), or the process may end (for example, if the feedback is that the revised target category is correct).

The following description (in conjunction with FIGS. 3A and 3B) describes an example in accordance with one or more embodiments of the invention. The example is for explanatory purposes only and is not intended to limit the scope of the invention. Terminology used in FIGS. 1 through 3B may be used in the example without further reference to FIGS. 1 through 3B.

EXAMPLE

Consider the following example, shown in FIGS. 4A through 5C, which describes classifying a financial transaction using a search engine in accordance with one or more embodiments described above. In the example, consider the scenario in which Jerry Allen (404) is a user (e.g., an individual creating a personal budget). Jerry Allen (404) enters into a number of financial transactions, one of which is buying donuts from the local donut shop. As shown in FIG. 4A, Jerry Allen (404) submits the text description provided on his receipt from the Donuts R Gr8 donut shop by scanning the receipt and using scanning software (e.g., optical character recognition software) to read the text description. In this case, the text description on the receipt reads "one dozen glazed donuts." The text description is sent to financial transaction classification application A (410).

Upon receiving the text description, as shown in FIG. 4B, financial transaction classification application A (410) classifies the text description in accordance with one or more embodiments described above. Initially, the text description is sent to classification engine A (420) to generate a search term. Using an algorithm that eliminates numbers and adjectives from the text description, classification engine A (420) generates a search term of "donuts." The search term is then sent to the category module (422) to generate a set of named categories. In this example, the named categories that make up the set of named categories are food, stationary, and entertainment.

The set of named categories is then sent to the classification engine B (424). If classification engine B (424) is different than classification engine A (420), then the category module also sends the search term to classification engine B (424). With the set of named categories and the search term, classification engine B (424) selects the affinity algorithm and the search algorithm. For this example, as shown in FIG. 5A, the search algorithm uses one search engine (Search Engine), and the affinity algorithm is the mathematical formula $D(x,y)=n(x \& y)/(sqrt(n(x) \times n(y)))$, where $n(x)$ is a number of web pages that include the search term (i.e., donuts) alone, $n(y)$ is a number of web pages that include one named category alone from the set of named categories, $n(x \& y)$ is a number of web pages that include both the search term and one named category from the set of named categories, and sqrt is a square root.

As shown in FIG. 4B, the search algorithm, the set of named categories, and the search term are then sent from classification engine B (424) to the search module (426). The search module (426) then conducts a number of searches, using one or more search engines (in this example, Search Engine) specified by the search algorithm, for the search term and each of the set of named categories. The search module (426) may also process the results of the searches. For example, the search module (426) may count the number of web pages that meet the criteria of each search. The search module (426) may also conduct the searches using the affinity algorithm.

Figures 5A, 5B, 5C:
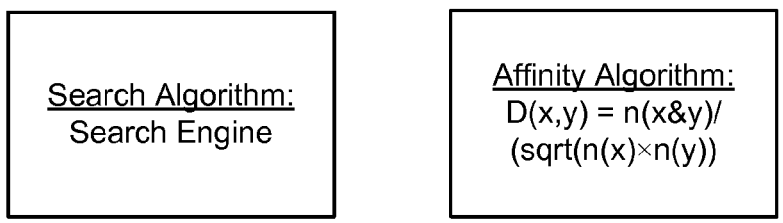
FIGS. 5A through 5C show an example in accordance with one or more embodiments of the invention.

In this example, as shown in FIG. 5B, a total of seven searches are conducted by the search module (426). With all searches being conducted on Search Engine, the search for "donuts" and "food" generates 4,640,000 results (i.e., web pages with at least one occurrence of "donuts" and at least one occurrence of "food"); the search for "donuts" generates 11,500,000 results; the search for "food" generates 742,000,000 results; the search for "donuts" and "stationary" generates 98,000 results; the search for "stationary" generates 40,300,000 results; the search for "donuts" and "entertainment" generates 2,640,000 results; and the search for "entertainment" generates 566,000,000 results.

Returning to FIG. 4B, when the search results have been processed by the search module (426), the processed search results are sent to the calculator (428). The calculator (428) also receives the affinity algorithm from classification engine B (424) and/or the search module (426). The calculator (428) calculates affinity scores for each named category of the set of named categories using the affinity algorithm.

Table 5C shows the resulting affinity scores calculated by the calculator (428) using the affinity algorithm. Specifically, the affinity score for the named category of "food" is 0.0502, the affinity score for the named category of "stationary" is 0.0046, and the affinity score for the named category of "entertainment" is 0.0327.

Returning to FIG. 4B, the affinity scores are then sent from the calculator (428) to classification engine C (430) to identify the target category. The affinity scores are compared against a target affinity score. In this case, the target affinity score is the highest affinity score of the set of named categories. Thus, the affinity score is 0.0502. Consequently, classification engine C (430) identifies "food" as the target category. In FIG. 4C, financial transaction classification application B (440) (or financial transaction classification application A (410) if the two applications are identical) presents the target category of "food" and the text description of "one dozen glazed donuts" to Jerry Allen (404). Additionally or alternatively, financial transaction classification application B (440) presents a thirty second video commercial to the user for donuts by the Local Donut Delites donut shop, a direct competitor of Donuts R Gr8. At the end of the commercial, a valuable coupon for a dozen donuts at the Local Donut Delites donut shop may be presented to the user.

One or more embodiments of the invention provide for classifying a financial transaction using a search engine. Specifically, embodiments of the invention allow a user to automatically classify a financial transaction to a target category based on a text description of the financial transaction. The process of classifying a financial transaction to a target category is typically a manual process (e.g., user assigns a financial transaction to a category). Embodiments of the invention may reduce the amount of time spent by the user and the number of errors that may occur by the user manually classifying a financial transaction to a category.

In embodiments of the invention, the user may be a person, accountant, or small business employee classifying each financial transaction to a category for purposes of budgeting, accounting, and/or financial management. Embodiments of the invention may also apply to other industries and applications. For example, in embodiments of the invention, the user may be a retailer partnering to sell an item to a vendor, where the item is the subject of the financial transaction. In such a case, the retailer and vendor may have different product hierarchies. The retailer may need to map its product hierarchy to the vendor's product hierarchy, and vice-versa. If the retailer has a large number of vendors, this mapping of a large number of product hierarchies (i.e., taxonomy) may be cumbersome without benefit of embodiments of the invention.

Embodiments of the invention may be used to automate an accounting function. Specifically, embodiments of the invention may be used to organize journal entries into an appropriate accounting system account (e.g., accounts receivable, accounts payable, payroll expense account). In the example, the accounting system accounts are categories. In such a scenario, a journal entry in a small business financial application may be classified to a target category in one or more embodiments of the invention. A cost associated with the journal entry may then be assigned to the corresponding account category for accounting purposes. For example, a financial transaction in the form of an invoice to a client for goods sold by a company to the client is classified, using embodiments of the invention, in a category of accounts receivable. A small business accounting application used by the company to run a set of monthly accounting statements then enters the financial transaction information associated with the invoice and assigns the financial transaction information to the accounts receivable category classified by embodiments of the invention. For example, the financial transaction information associated with the invoice may be used by the small business account application to generate a statement of cash flows, where the invoice is listed among the account receivables of the current assets. Embodiments of the invention may be used to classify a financial transaction for use by other personal and small business applications to generate, for example, one or more financial statements.

Embodiments of the invention may also be used to classify an expense description (i.e., transaction information) in a corporate expense-tracking system to one of a number of categories, where each category is an employee and/or a department of the company. Once the expense description is classified by embodiments of the invention and routed to that person and/or department, that person and/or department may determine whether the expense should be approved. For example, an expense description entered in a corporate expense-tracking system may be "lunch at Aqua Cuisine in Tiskilwa, Ill., with Bob Smith from Ourbestclient Company." Embodiments of the invention may classify the expense description as originating from the sales department of the company. Embodiments of the invention may also classify a person responsible for approving such an expense.

Embodiments of the invention may also be used to place a product in a manufacturer's product catalog into an appropriate section of a vendor's e-commerce site. In such a case, the manufacturer may manufacture a number of different products. For example, a manufacturer may make a number of different products available to the vendor to sell to a consumer. For the vendor to effectively sell the product on the vendor's e-commerce site, the product must be placed in a portion of the e-commerce site where the consumer is likely to find the product. For example, assume that the product manufactured by the manufacturer is a pen. In embodiments of the invention, "pen" may be used as the search term, and the shopping areas listed on the vendor's e-commerce site may be the set of named categories. Embodiments of the invention may determine that the pen should be listed in the "office supplies" portion of the vendor's e-commerce site.

Embodiments of the invention may also be used to target marketing offers to the consumer. For example, a text description of a financial transaction may be entered into a personal finance application. Embodiments of the invention may categorize the financial transaction into a target category. Subsequently, based on one or more advertisements received by one or more advertisers, embodiments of the invention may retrieve an advertisement associated with the item of the financial transaction based on the target category assigned to the financial transaction. The advertisement may then be displayed to the user, such as by an email, a text message, a telephone call, a pop-up window on a screen, an animated commercial, and/or some other suitable means of display. The advertisement displayed to the consumer may be for a competing and/or alternative item relative to the item of the financial transaction.

As another example, a consumer (i.e., user) using a mobile device to shop (i.e., express a desire to enter into a prospective financial transaction) for an item, such as a product or service, may benefit from embodiments of the invention. The consumer may indicate that he is interested in buying the product and/or service by typing a keyword (e.g., spaghetti) in a search engine. Merchants (e.g., restaurants) may then enter discounted/special offers which includes or is linked to details of the offer (e.g., all you can eat Italian food for $10). Such merchant offers may be available to the general public and/or specific to the consumer in response to the consumer's keywords. The merchant may also enter keywords (e.g., pasta, pizza) regarding the offer made by the merchant. Embodiments of the invention may be used to determine a match between the consumer's keywords and the merchant's offer and/or keywords. In other words, the consumer keyword may be the search term, and the merchant offers and/or keywords may be used for the set of named categories. Various algorithms designed for a consumer shopping for a good and/or service may be used to provide a practical and desired result. For example, a search algorithm for such an application of embodiments of the invention may determine, based on the consumer keyword, a selection by the consumer, and/or some other indication, that only restaurant search engines should be used. In such a case, other features of the mobile device, such as global positioning, may be used in conjunction with embodiments of the invention to create a practical match between the consumer and the merchant.

As a variation of the above example, categories that are used with the consumer's keywords may be pre-determined based on some indication by the consumer. For example, the consumer may select a checkbox to indicate that he wants to enter into a prospective financial transaction and is looking for offers. A timeframe for which the prospective financial transaction is to be executed may be indicated, either by the consumer or the merchant. Merchants may respond with offers for the good and/or service specifically requested by the consumer and/or equivalent goods and/or services. In this example, embodiments of the invention generate a solicitation to merchants based on search results for the keywords entered by the consumer and the categories selected. For example, if a consumer wants to buy a George Foreman® grill. (George Foreman® is a registered trademark of Salton, Inc. of Miramar, Fla.) The consumer enters "George Foreman® grill" and selects a checkbox to indicate that the query is for a prospective purchase. The categories chosen by embodiments of the invention are "barbeque," "grill" and "George Foreman® grill." The search is essentially a query to merchants, and the search results are offers made by the merchants. Some merchants may offer a George Foreman® grill, while other merchants may offer other types and/or brands of indoor, healthy grills. The best offers (or number of offers, such as the five best offers) from each category are then presented to the consumer.

Embodiments of the invention may also be used to detect fraud and alert one or more entities of the potential fraud. For example, a description of a credit card transaction may be entered into a personal finance application for the holder of the credit card (i.e., the user). In this case, the personal finance application acts as a financial transaction source for the credit card transaction. Embodiments of the invention may categorize the financial transaction and determine that the target category to which the financial transaction is classified is a category that rarely, if ever, is matched as a target category for financial transactions of the user. In other words, the purchase on the user's credit card is outside of the user's normal buying pattern. In this case, embodiments of the invention may be configured to seek confirmation with respect to the financial transaction from the user. If the user does not recognize (i.e., fails to confirm) the financial transaction, then embodiments of the invention may notify the user that a fraud has occurred and notify one or more entities (e.g., the issuer of the credit card, the vendor of the financial transaction, one or more credit reporting agencies, the police) of the fraud.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying a financial transaction of an item, comprising:
   receiving a text description of the item involved in the financial transaction;
   processing, using a computer processor, the text description of the item to generate a search term;
   selecting, based on the search term, a set of named categories of a plurality of named categories;
   conducting, using a first search engine determined by a search algorithm, a first search for the search term and each named category of the set of named categories;
   processing, using the computer processor, a first plurality of results of the first search;

calculating, using the first plurality of results of the first search and an affinity algorithm, an affinity score of a plurality of affinity scores for each named category of the set of named categories;

identifying a first target affinity score of the plurality of affinity scores,
   wherein the affinity algorithm for one of the set of named categories uses the function: $\log \{n(x \ \& \ y)/[n(x) \times n(y)]\}$,
   wherein $n(x)$ is a first number of web pages comprising the search term,
      $n(y)$ is a second number of web pages comprising the one of the set of named categories,
      $n(x \ \& \ y)$ is a third number of web pages comprising the search term and the one of the set of named categories, and
      log is a logarithm;

identifying a target category from the set of named categories based on the first target affinity score;

presenting, to a user, the text description of the item involved in the financial transaction and the target category;

receiving feedback that the target category for the financial transaction is incorrect;

generating a revised set of named categories by removing the target category from the set of named categories;

conducting, using the search algorithm, a second search for the search term and each named category of the revised set of named categories; and presenting, based on a second plurality of results of the second search, a revised target category based on a second target affinity score.

2. The method of claim 1, further comprising:
selecting, in response to the feedback, a revised affinity algorithm to replace the affinity algorithm,
wherein the revised affinity algorithm is used to calculate a revised affinity score for each named category of the revised set of named categories.

3. The method of claim 1, further comprising:
selecting the search algorithm from a set of pre-approved search algorithms and the affinity algorithm from a set of pre-approved affinity algorithms.

4. The method of claim 1, further comprising:
selecting, based on the revised set of named categories, a revised search algorithm to replace the search algorithm and conduct the second search; and
calculating, using the first plurality of revised results and the affinity algorithm, a revised affinity score of a plurality of revised affinity scores for each named category of the revised set of named categories.

5. The method of claim 1, wherein selecting the set of named categories comprises:
determining a number of web pages comprising the search term and each of the plurality of named categories; and
selecting each of the plurality of named categories having the number of web pages above a threshold value to generate the set of named categories.

6. The method of claim 1, wherein processing the first plurality of results of the first search comprises counting a number of web pages comprising the search term and each named category of the set of named categories.

7. The method of claim 1, wherein calculating the affinity score for each named category comprises:
compiling an affinity matrix between the search term and each named category of the set of named categories; and
applying a Pearson correlation to the affinity matrix to determine the affinity score for each named category.

8. The method of claim 1, wherein the user is a retailer partnering to sell the item with a vendor.

9. The method of claim 1, wherein the user is a consumer using a mobile device to purchase the item from a vendor offering a special sale on the item.

10. The method of claim 1, wherein the search algorithm is modified, based on an average quality of the search engine, to generate a modified search algorithm.

11. The method of claim 1, wherein the search algorithm uses a plurality of search engines, wherein each of the plurality of search engines contributes to a portion of the affinity score using a weighting based on past performance.

12. The method of claim 1, further comprising:
generating, in response to the feedback, a revised search term to replace the search term for the second search,
wherein the revised search term broadens the search term by adding an equivalent item for the item.

13. The method of claim 1, further comprising:
determining that the target category classifies less than a threshold amount of financial transactions during a period of time;
generating, based on determining that the target category classifies less than the threshold amount of financial transactions during the period of time, a fraud alert; and
displaying the fraud alert.

14. The method of claim 1, wherein the text description triggers an advertisement associated with the item of the financial transaction, wherein the advertisement is presented with the revised target category.

15. The method of claim 1, wherein the target category is an accounting category used in an accounting application.

16. The method of claim 1, wherein the text description is an expense description associated with a corporate expense, and wherein the target category is a department of a company corresponding to the expense description.

17. The method of claim 1, wherein the text description is for a product of a manufacturer, and wherein the target category is a section of an e-commerce site of a vendor offering the product for sale.

18. A method for presenting an advertisement based on classifying a financial transaction of an item, comprising:
receiving a text description of the item involved in the financial transaction;
processing, using a computer processor, the text description of the item to generate a search term;
selecting, based on the search term, a set of named categories of a plurality of named categories;
conducting, using a search engine determined by a search algorithm, a search for the search term and each named category of the set of named categories;
processing, using the computer processor, a plurality of results of the search;
calculating, using the plurality of results of the search and an affinity algorithm, an affinity score of a plurality of affinity scores for each named category of the set of named categories;
identifying a first target affinity score of the plurality of affinity scores,
   wherein the affinity algorithm for one of the set of named categories uses the function: $\log \{n(x \ \& \ y)/[n(x) \times n(y)]\}$,
   wherein $n(x)$ is a first number of web pages comprising the search term,
      $n(y)$ is a second number of web pages comprising the one of the set of named categories, n(x & y) is a third number of web pages comprising the search term and the one of the set of named categories, and log is a logarithm;

identifying a target category from the set of named categories based on the target affinity score;

selecting, using an advertisement algorithm, the advertisement based on the advertisement advertising a product in the target category; and presenting the advertisement.

19. A system for classifying a financial transaction of an item, comprising:

a computer processor;

a classification engine executing on the computer processor and configured to:

receive a text description of the item involved in the financial transaction;

process the text description of the item to generate a search term; and receive, from a user, feedback that a target category based a target affinity score is incorrect;

a category module operatively connected to the classification engine and executing on the computer processor and configured to:

receive the search term from the classification engine;

select, based on the search term, a set of named categories of a plurality of named categories; and generate, in response to the feedback, a revised set of named categories by removing the target category from the set of named categories;

a search module operatively connected to the classification engine and executing on the computer processor and configured to:

conduct, using a search engine determined by a search algorithm, a first search for the search term and each named category of the set of named categories;

process a first plurality of results of the first search;

conduct a second search for the search term and each named category of the revised set of named categories; and process a second plurality of results of the second search; and a calculator operatively connected to the classification engine and executing on the computer processor and configured to:

calculate, using the first plurality of results of the first search and an affinity algorithm, an affinity score of a plurality of affinity scores for each named category of the set of named categories;

identify a first target affinity score of the plurality of affinity scores, wherein the affinity algorithm for one of the set of named categories uses the function: $\log \{n(x \& y)/[n(x) \times n(y)]\}$, wherein $n(x)$ is a first number of web pages comprising the search term, $n(y)$ is a second number of web pages comprising the one of the set of named categories, $n(x \& y)$ is a third number of web pages comprising the search term and the one of the set of named categories, and log is a logarithm;

identify a target category from the set of named categories based on the first target affinity score;

send, to the classification engine, the text description of the item involved in the financial transaction and the target category;

calculate, using the second plurality of results of the second search, a second affinity score of a second plurality of affinity scores for each named category of the revised set of named categories;

identify a second target affinity score of the second plurality of affinity scores;

identify a revised target category from the revised set of named categories based on the second target affinity score; and send, to the classification engine, the revised target category, wherein the classification engine displays, to the user, the text description of the item involved in the financial transaction, the target category based the target affinity score, and the revised target category based on the second target affinity score.

20. The system of claim 19, wherein the classification engine is further configured to:

select the search algorithm from a set of pre-determined search algorithms; and select the affinity algorithm from a set of pre-determined affinity algorithms.

21. The system of claim 19, wherein the classification engine is further configured to:

select, in response to the feedback, a revised affinity algorithm to replace the affinity algorithm, wherein the revised affinity algorithm is used to calculate a revised affinity score for each named category of the revised set of named categories.

22. The system of claim 19, wherein the classification engine is further configured to:

select, based on the feedback, a revised search algorithm to replace the search algorithm, wherein the revised search algorithm is determined using the revised set of named categories.

23. The system of claim 19, wherein the classification engine is further configured to:

modify, based on an average quality of the search engine, the search algorithm to generate a modified search algorithm by replacing the search engine with a replacement search engine.

24. The system of claim 19, further comprising:

a storage repository configured to store a plurality of search algorithms and a plurality of affinity algorithms.

25. The system of claim 24, wherein the financial transaction source is at least one selected from a group consisting of a vendor, a financial institution, and the user.

26. The system of claim 19, further comprising:

a security module configured to authenticate communication with the user.

27. The system of claim 19, further comprising:

an item equivalence module executing on the computer processor and configured to:

determine an equivalent text description of an equivalent item to the item involved in the financial transaction, wherein the equivalent text description is processed by the classification engine to generate a revised search term, wherein the revised search term replaces the search term for the second search.

28. The system of claim 19, further comprising:

an advertisement module executing on the computer processor and configured to:

determine, based on the text description, an advertiser with an advertisement associated with the item involved in the financial transaction, wherein the advertisement is shown to the user.

29. The system of claim 19, wherein the classification module processes the text description of the item by removing at least one selected from a group consisting of common words, adjectives, and prepositional phrases from the text description.

30. The system of claim 19, wherein the classification engine is further configured to:
  determine that the target category classifies less than a threshold amount of financial transactions during a period of time;
  generate, based on determining that the target category classifies less than the threshold amount of financial transactions during the period of time, a fraud alert; and
  display the fraud alert.

31. A non-transitory computer readable medium comprising computer readable program code embodied therein for performing a method for classifying a financial transaction of an item, the method comprising:
  receiving a text description of the item involved in the financial transaction;
  processing the text description of the item to generate a search term;
  selecting, based on the search term, a set of named categories of a plurality of named categories;
  conducting, using a first search engine determined by a search algorithm and, a first search for the search term and each named category of the set of named categories;
  processing a first plurality of results of the first search;
  calculating, using the first plurality of results of the first search and an affinity algorithm, an affinity score of a plurality of affinity scores for each named category of the set of named categories;
  identifying a first target affinity score of the plurality of affinity scores,
    wherein the affinity algorithm for one of the set of named categories uses the function: $\log \{n(x \ \& \ y)/[n(x) \times n(y)]\}$,
    wherein $n(x)$ is a first number of web pages comprising the search term,
      $n(v)$ is a second number of web pages comprising the one of the set of named categories,
      $n(x \ \& \ y)$ is a third number of web pages comprising the search term and the one of the set of named categories, and
      log is a logarithm;
  identifying a target category from the set of named categories based on the first target affinity score;
  presenting, to a user, the text description of the item involved in the financial transaction and the target category;
  receiving feedback that the target category for the financial transaction is incorrect;
  generating a revised set of named categories by removing the target category from the set of named categories;
  conducting, using the search algorithm, a second search for the search term and each named category of the revised set of named categories; and
  presenting, based on a second plurality of results of the second search, a revised target category based on a second target affinity score.

32. The non-transitory computer readable medium of claim 31, the method further comprising:
  selecting, in response to the feedback, a revised affinity algorithm to replace the affinity algorithm,
  wherein the revised affinity algorithm is used to calculate a revised affinity score for each named category of the revised set of named categories.

33. The non-transitory computer readable medium of claim 31, the method further comprising:
  selecting the search algorithm from a set of pre-approved search algorithms and the affinity algorithm from a set of pre-approved affinity algorithms.

34. The non-transitory computer readable medium of claim 31, the method further comprising:
  selecting, based on the revised set of named categories, a revised search algorithm to replace the search algorithm and conduct the second search; and
  calculating, using the first plurality of revised results and the affinity algorithm, a revised affinity score of a plurality of revised affinity scores for each named category of the revised set of named categories.

* * * * *